(12) United States Patent
Omori et al.

(10) Patent No.: US 12,244,727 B2
(45) Date of Patent: Mar. 4, 2025

(54) USER CREDENTIAL CONTROL SYSTEM AND USER CREDENTIAL CONTROL METHOD

(71) Applicant: Nippon Telegraph and Telephone Corporation, Tokyo (JP)

(72) Inventors: Yoshihiko Omori, Musashino (JP); Takao Yamashita, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 294 days.

(21) Appl. No.: 17/635,589

(22) PCT Filed: Aug. 20, 2019

(86) PCT No.: PCT/JP2019/032434
§ 371 (c)(1),
(2) Date: Feb. 15, 2022

(87) PCT Pub. No.: WO2021/033262
PCT Pub. Date: Feb. 25, 2021

(65) Prior Publication Data
US 2022/0321357 A1 Oct. 6, 2022

(51) Int. Cl.
*H04L 9/32* (2006.01)

(52) U.S. Cl.
CPC .......... *H04L 9/3247* (2013.01); *H04L 9/3236* (2013.01); *H04L 9/3263* (2013.01)

(58) Field of Classification Search
CPC ... H04L 9/3247; H04L 9/3236; H04L 9/3263; G06Q 50/10
See application file for complete search history.

(56) References Cited

U.S. PATENT DOCUMENTS

2008/0072301 A1* 3/2008 Chia .................. H04L 63/0815
726/8
2010/0082687 A1* 4/2010 Saito ...................... G06F 21/10
707/786
(Continued)

OTHER PUBLICATIONS

[No Author Listed], "Sovrin: A Protocol and Token for Self-Sovereign Identity and Decentralized Trust," Evernym, A White Paper from the Sovrin Foundation Version 1.0, Jan. 2018, 42 pages.
(Continued)

*Primary Examiner* — Daniel B Potratz
*Assistant Examiner* — Matthias Habtegeorgis
(74) *Attorney, Agent, or Firm* — Fish & Richardson P.C.

(57) ABSTRACT

In a user credential control system, an access control server includes a token issuing unit that issues, to a service provider server, a token in which a user credential that can be acquired by the service provider server is described according to the company name and the type of a service of the service provider server described in an electronic certificate, a policy registration unit that registers a policy of an access authority of the service provider server to the user credential based on the company name or the type of the service of the service provider server, and a notification reception unit that, when the user credential of the user terminal has been changed, acquires the service provider server with the access authority to the user credential from a token according to the registered policy to notify the service provider server of the change of the user credential.

14 Claims, 22 Drawing Sheets

(56) References Cited

U.S. PATENT DOCUMENTS

| | | | | |
|---|---|---|---|---|
| 2010/0281522 A1* | 11/2010 | Hatakeyama | ....... | H04L 63/0823 |
| | | | | 726/4 |
| 2013/0262858 A1* | 10/2013 | Neuman | .................. | H04L 9/30 |
| | | | | 713/155 |
| 2015/0341340 A1* | 11/2015 | Lu | ........................ | H04L 9/3234 |
| | | | | 726/6 |
| 2016/0191499 A1* | 6/2016 | Momchilov | ............ | G06F 21/78 |
| | | | | 713/171 |
| 2020/0145223 A1* | 5/2020 | Yang | ..................... | H04L 9/0866 |
| 2020/0274713 A1* | 8/2020 | Li | ......................... | H04L 9/3221 |
| 2020/0336309 A1* | 10/2020 | Wang | ...................... | G06F 21/33 |
| 2020/0403805 A1* | 12/2020 | Steele | ................... | H04L 9/3242 |
| 2021/0167972 A1* | 6/2021 | Zang | ................... | H04L 63/0823 |

OTHER PUBLICATIONS

Tobin, "Sovrin: What Goes on the Ledger?" Evernym, Apr. 2017, Updated Sep. 2018, 12 pages.

W3C [online], "Decentralized Identifiers (DIDs) v.0.13," Draft Community Group Report, Jun. 19, 2019, retrieved on Jul. 1, 2019, retrieved from URL<https://w3c-ccg.github.io/did-spec/>, 44 pages.

* cited by examiner

USER CREDENTIAL CONTROL SYSTEM AND USER CREDENTIAL CONTROL METHOD

CROSS-REFERENCE TO RELATED APPLICATION

This application is a National Stage Application under 35 U.S.C. § 371 of International Application No. PCT/JP2019/032434, having an International Filing Date of Aug. 20, 2019, and which application is incorporated herein by reference. To the extent appropriate, a claim of priority is made to the above disclosed application.

TECHNICAL FIELD

The present invention relates to a user credential control system and a user credential control method.

BACKGROUND ART

An ID for identifying a user (a user ID) and user information associated with the user ID (a user credential 23) need to be managed to enable the user to make use of electronic commercial transactions or membership-based web services (online stores, employment support sites, and the like). In such a case, user convenience, protection of privacy, and service operability of the web service provider are expected to be considered.

PTL 1 describes coordination of a user ID and a user credential 23 when Decentralized Identifiers (DIDs) of the World Wide Web Consortium (W3C) are used.

FIG. 20 is a configuration diagram of a system 1 using a DID of the W3C described in PTL 1.

[Case in which User is Registered in Website of Service Provider]

A user terminal 11 creates a DID document 21 identified with the user ID (Decentralized ID or DID) that it owns and manages, and registers the DID document in a shared ledger 13 (e.g., a blockchain) on the Internet 12 as illustrated in FIG. 20. The DID document 21 includes a public key (generated by the user terminal 11) for authenticating a service endpoint 14 (e.g., a storage) in which the user credential 23 (user information such as a name, address, work history, education history, or qualification) 23 is registered and the owner (user) of the DID document 21. This DID document 21 is electronically signed by a user information issuing organization 15 after the authenticity of the user is confirmed, and the user information issuing organization 15 guarantees the authenticity of the DID document 21 (see S1 and S2).

The user terminal 11 registers its user credential 23 in the service endpoint 14 by associating it with its DID. This user credential 23 is electronically signed by the user information issuing organization 15 after the authenticity of the user terminal 11 (Verifiable Credential) is confirmed, and the user information issuing organization 15 guarantees the authenticity of the user credential 23 (see S3 and S4).

The user terminal 11 presents its DID to a service provider server 16 to start user registration (see S5).

The service provider server 16 searches a resolver 17 for the location of the DID document 21 to refer to the DID document 21 of the user terminal 11 present in the shared ledger 13 using the DID (see S6) and then acquires the DID document 21 (see S7).

The service provider server 16 extracts the public key of the user terminal 11 from the acquired DID document 21, and verifies that the DID document 21 has been registered by the authenticated user terminal 11 through challenge-response authentication with the user terminal 11. Furthermore, the signature on the DID document 21 is verified using the previously acquired public key of the user information issuing organization 15 to confirm the authenticity of the DID document 21 (Authentication) (see S8). Here, the authenticity of the person claiming to be a user who is qualified to receive provision of the service is confirmed.

The service provider server 16 accesses the service endpoint 14 described in the DID document 21 to acquire the user credential 23 of the user terminal 11 and registers service use of the user terminal 11 (see S10 "service use registration"). At this time, the signature on the user credential 23 is verified by the user information issuing organization 15 (see S9 "reference") to check the authenticity of the user credential 23.

FIG. 21 is a diagram illustrating an example of items of a user credential 23 and an example of content of the user credential 23.

The user terminal 11 provides the service provider server 16 with its user credential 23 (user information such as a name, address, work history, education history, or qualification) 23. For example, while it is possible to provide credential items "name and address" to a certain service provider, it is not possible to provide "date of birth and work history" as illustrated in FIG. 21. In addition, although telephone numbers of "mobile phones" can be included in the content of the user credential 23, "phone numbers of fixed-line telephones" are not included. The user terminal 11 can make the above-described selection for each service provider server 16.

PLT 2 and PLT 3 describe transmission of a user credential 23 using Hyperledger Indy. FIG. 22 is a configuration diagram illustrating transmission of a user credential 23 using Hyperledger Indy described in PLT 2 and PLT 3.

[Case in which User Presents Graduation Certificate to Company to Apply for Job]

A school server 37 (Issuer) is installed in a school or on a network that can be accessed by the school, and retains a graduation certificate (the user credential 23). The school server 37 associates the public key of a public-private key pair that it has generated, an ID (Decentralized ID or DID) that the school server 37 owns and manages, and a credential definition 34 (including the public key) defining written items of the graduation certificate (the user credential 23) with each other, and registers the associated information in a shared ledger 13 (see S11). The credential definition 34 includes a signature with the private key generated by the school server 37.

A user terminal 11 accesses the website of the school server 37 to be redirected to the location in the shared ledger 13 at which the credential definition 34 is arranged (credential definition ID) or the like, and then acquires the credential definition 34 (see S12). In addition, the user terminal 11 requests the website of the school server 37 to issue a graduation certificate using this credential definition 34 to acquire a graduation certificate 36 including items described in the credential definition 34 from the school server 37 (see S13), and stores the graduation certificate in the user terminal 11. The graduation certificate 36 based on a graduate list 35 and each item described in the graduation certificate 36 are signed with the private key generated by the school server 37.

In addition, the user terminal 11 accesses the website of a company server 38 (Verifier) and applies for the job offer by transmitting the described items of the graduation certificate 36, an address, and the like requested by the company (see S14). At this time, the user terminal 11 also transmits the credential definition ID of the graduation certificate 36 as job qualification information (see S15).

The company server 38 acquires the DID of the school server 37 from the shared ledger 13 using the credential definition ID included in the transmitted job qualification information. Then, the company server 38 acquires the public key of the school server 37 from the acquired DID (see S16).

The company server 38 uses the acquired public key to verify the signature of the described items of the graduation certificate 36 transmitted as the job qualification information, then checks the authenticity of the described items, and verifies the qualification (see S17).

[Case in which Model of User Terminal 11 is Changed, Etc.]

When a model of the user terminal 11 is changed or the user terminal 11 is lost, the user needs to transfer the acquired credential to the new terminal or acquire a credential again. In addition, when a credential that may change in the life cycle, such as an address, is changed in job qualification information, the user terminal 11 needs to transmit the changed credential to each company again.

The case in which the user presents a graduation certificate to a company for a job offer has been described above.

CITATION LIST

Non Patent Literature

NPL 1: W3C, Decentralized Identifiers (DIDs) v.0.13, Draft Community Group Report, Jun. 19, 2019, [online], [Retrieved on Jul. 1, 2019], Internet <URL: https://w3c-ccg.github.io/did-spec/>

NPL 2: Sovrin™: A Protocol and Token for Self-Sovereign Identity and Decentralized Trust, A White Paper from the Sovrin Foundation Version 1.0, January 2018 NPL 3: Sovrin: What Goes on the Ledger? Andrew Tobin, Evernym, Updated September 2018

SUMMARY OF THE INVENTION

Technical Problem

The technology described in PTL 1 has a problem in that it is difficult for a user to select and control items and content of a credential to be provided for each service provider. For example, because items and content of a credential to be provided vary depending on each service provider server as illustrated in FIG. 21, a user should select and control an item and content of a credential for each service.

According to the technique described in PTL 2 and PTL 3, a user stores and manages a credential in his or her own terminal. For this reason, the user needs to transfer the acquired credential to a new terminal or acquire a credential again, which causes a problem with user convenience. In addition, when the model of the user terminal is changed or the terminal is lost, a credential should be acquired from the school (Issuer) again.

Furthermore, when a credential included in job qualification information that may change in the life cycle, such as an address, is changed, the user needs to transmit the credential to each company again, which causes a problem with user convenience.

The present invention has been conceived taking the above-described background into account and aims to enable a changed credential to be acquired by a service provider server without passing through a user terminal when a credential of the user terminal is changed.

Means for Solving the Problem

To solve the above-described problems, the present invention provides a user credential control system in which a service provider server and a service endpoint storing a user credential are present on a network to which a user terminal is connected, the user credential control system including an access control server configured to serve as one service endpoint to control a user ID for identifying the user terminal and a user credential that is user information associated with the user ID in association with each other, wherein the access control server includes a token issuing unit configured to receive an electronic certificate from the service provider server and issue, to the service provider server, a token in which a user credential that can be acquired by the service provider server is described according to a company name and a type of a service of the service provider server described in the electronic certificate, a policy registration unit configured to register a policy of an access authority of the service provider server to the user credential based on the company name or the business type of the service of the service provider server, and a notification unit configured to, when the user credential of the user terminal has been changed, acquire the service provider server with the access authority to the user credential from the token according to the registered policy to notify the service provider server of the change of the user credential.

Advantageous Effects of the Invention

In the present invention, when a credential of a user terminal is changed, the changed credential can be acquired by a service provider server without passing through the user terminal.

DESCRIPTION OF EMBODIMENTS

Hereinafter, a user credential control system and the like according to a mode for implementing the present invention (hereinafter referred to as "the present embodiment") will be described with reference to the drawings.

Figure 1:
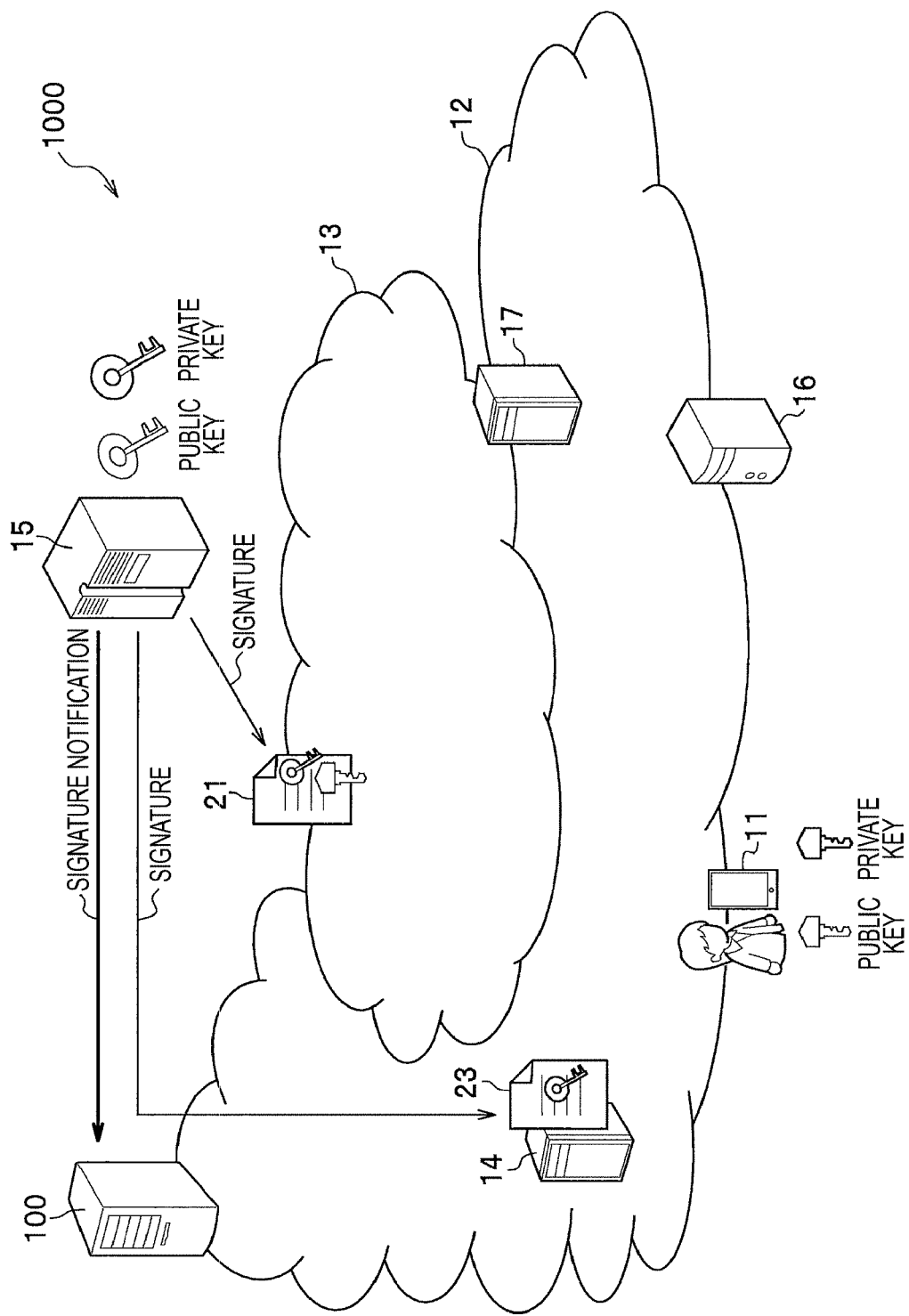
FIG. 1 is a configuration diagram illustrating a user credential control system according to an embodiment of the present invention.

FIG. 1 is a configuration diagram illustrating a user credential control system according to an embodiment of the present invention. The present embodiment is an example of an application to a system in which DIDs of the W3C described in PTL 1 are used. The same reference signs are given to the same constituent parts as those in FIG. 20.

A user credential control system 1000 includes an authorization server 100 (an access control server) serving as one service endpoint based on DIDs of the W3C, as illustrated in FIG. 1. The user credential control system 1000 is a system in which a shared ledger 13 (e.g., a blockchain), a service provider server 16, and a service endpoint 14 (e.g., a storage) that stores a user credential 23 which is user information associated with a user ID for identifying a user terminal 11 are present on a network (here, the Internet 12) to which the user terminal 11 is connected.

[User Terminal 11]

The user terminal 11 is, for example, a personal computer, a smartphone, or the like.

The location of the authorization server 100 is described as a service endpoint in a Decentralized ID (DID) document 21 registered by the user terminal 11.

[Service Endpoint 14]

The service endpoint 14 is an endpoint that is accessible from the Internet 12 (a server, a personal computer, or a terminal such as a smartphone connected to the network).

The service endpoint 14 stores the user credential 23 and identifies, from information stored in a token (information described in the token), the accessibility of the service provider server 16 and the user credential 23 that can be acquired by the service provider server 16.

[User Information Issuing Organization 15]

A user information issuing organization 15 transmits a signature notification when the DID document 21 or the user credential 23 of the user terminal 11 identified with a DID has been signed.

[Service Provider Server 16]

The service provider server 16 acquires an electronic certificate certifying the company name and type of the service of the service provider server 16 from an authentication station 20 (see FIGS. 5 and 6) and presents the electronic certificate to the authorization server 100 of which the location is identified from the DID document 21. The DID document 21 is registered by the user terminal 11. The DID document 21 describes the location of the authorization server 100 as a service endpoint.

The service provider server 16 acquires the location of the authorization server 100 from the DID document 21 and then accesses the authorization server 100 to acquire a token. The service provider server 16 accesses the service endpoint 14 storing the user credential 23 based on information stored in the token (information described in the token).

[Authorization Server 100]

The authorization server 100 is added as one server constituting the service endpoint described in the DID document 21 of DIDs of the W3C.

Figure 2:
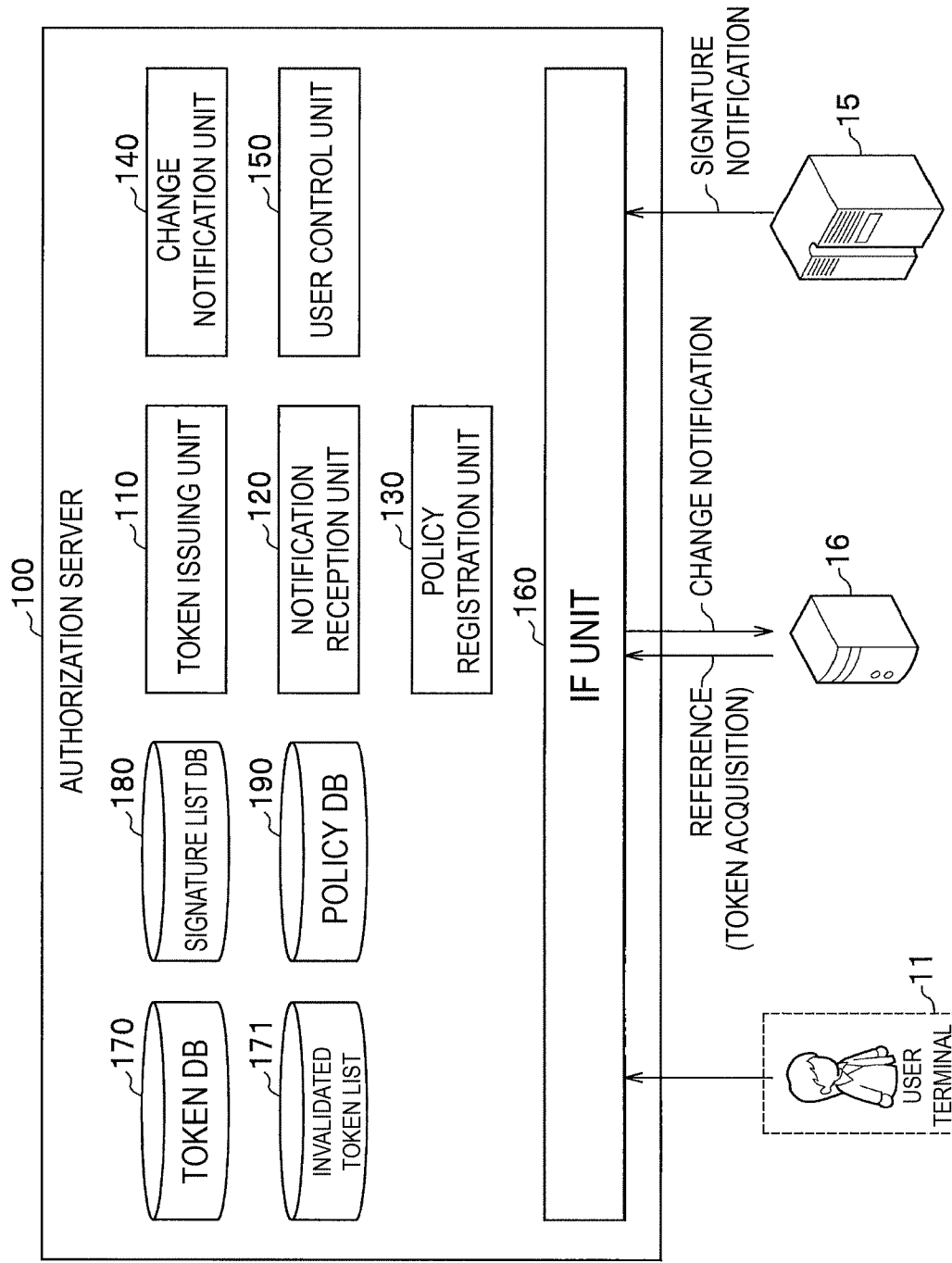
FIG. 2 is a block diagram illustrating a configuration of an authorization server of the user credential control system according to the embodiment of the present invention.

FIG. 2 is a block diagram illustrating a configuration of the authorization server 100. The authorization server 100 includes a token issuing unit 110, a notification reception unit 120 (a notification unit), a policy registration unit 130, a change notification unit 140 (a notification unit), a user control unit 150, an IF unit 160, a token DB 170, an invalidated token list 171, a signature list DB 180, and a policy DB 190 as illustrated in FIG. 2.

The token issuing unit 110 receives an electronic certificate 25 (see FIG. 3) from the service provider server 16 and issues a token 24 (see FIG. 3) in which a user credential 23 (see FIGS. 3 and 4) that can be acquired by the service provider server 16 is described to the service provider server 16 in accordance with the company name and service type of the service provider server 16 described in the electronic certificate 25. In addition, the token issuing unit 110 also describes the validity period of the token 24 in the token 24. When the validity period of the token has expired since issuance of the token, if the user terminal 11 authorizes provision of the user credential 23 to the service provider server 16, the token issuing unit 110 issues a new token 24 to the service provider server 16.

Figure 5:
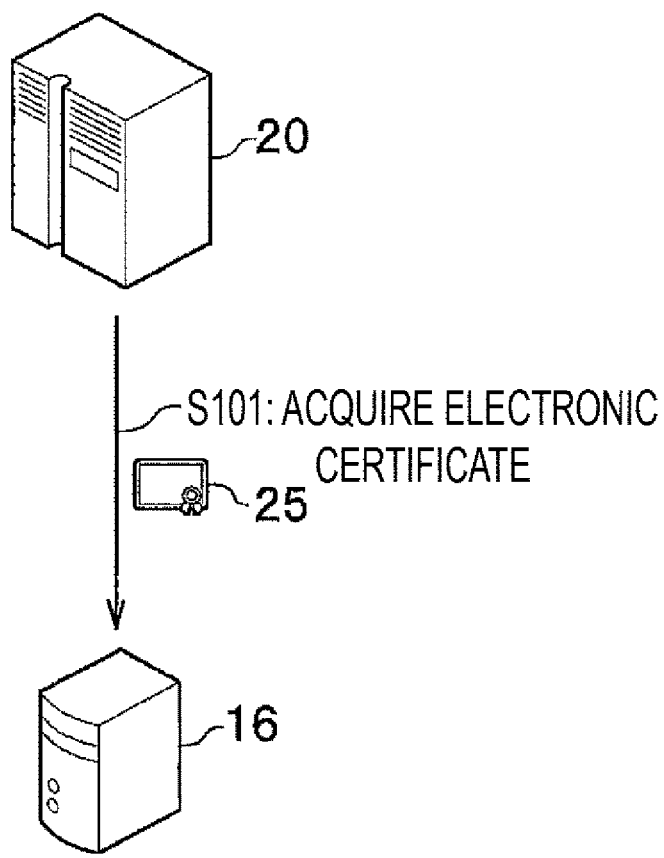
FIG. 5 is a diagram illustrating an example of a case in which an electronic certificate is issued to a service provider server of the user credential control system according to the embodiment of the present invention.
Figure 6:
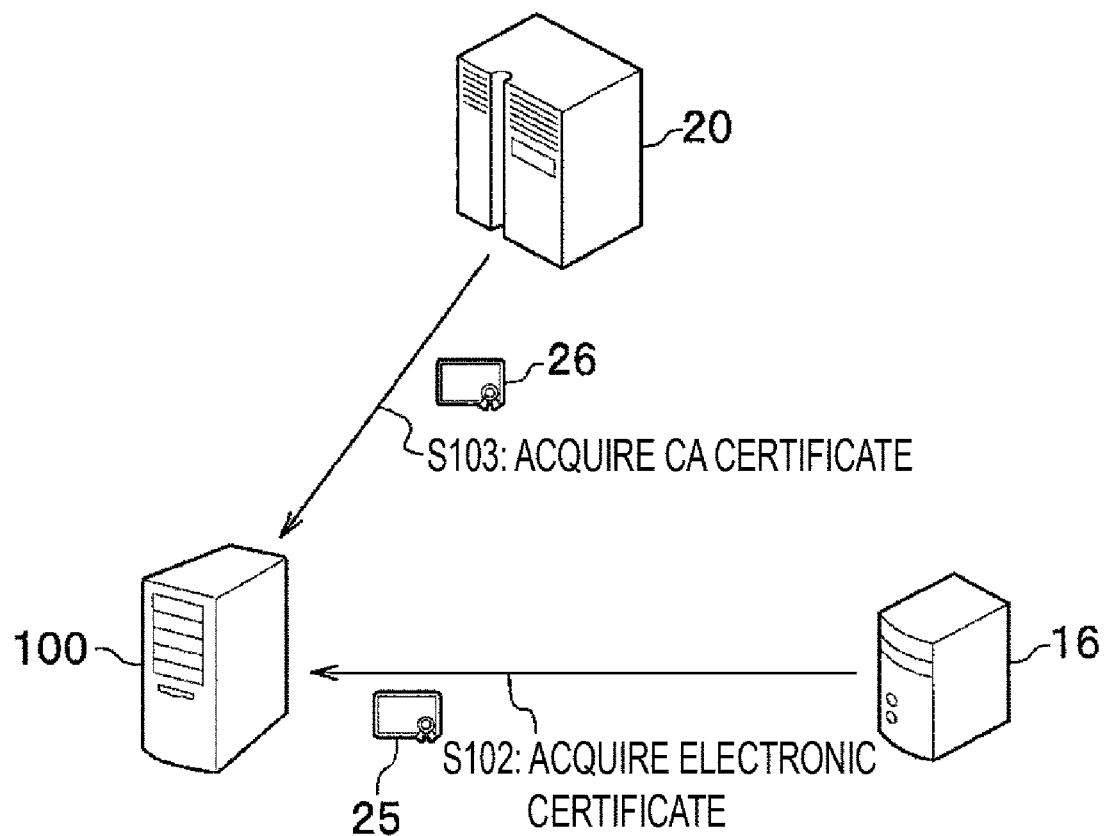
FIG. 6 is a diagram illustrating registration of token issuance policy by the authorization server in the user credential control system according to the embodiment of the present invention.

The authorization server 100 appends a signature to the token 24 signed with the electronic certificate issued to the authorization server 100 from the authentication station 20 (see FIGS. 5 and 6). In addition, the service endpoint 14 storing the user credential 23 also checks the authenticity of the token 24 when the token 24 is acquired from the service provider server 16.

The notification reception unit 120 receives a signature notification from the user information issuing organization 15, and stores a list of signed user credentials 23 in the signature list DB 180, among first DID documents 21 identified by the user identifier described in the DID document 21 (see FIGS. 3 and 4) of the user terminal 11, for each of the first DID document 21. In a case of the signature notification when the user credential 23 is changed, the notification reception unit 120 requests a credential change notification from the change notification unit 140.

The policy registration unit 130 registers a reference availability rule (policy) of the user credential 23 in the policy DB 190 for each company name and service type of the service provider server 16.

The change notification unit 140 receives a credential change notification request from the notification reception unit 120 that has received a signature notification due to the change of the user credential 23 from the user information issuing organization 15, acquires a list of service provider servers 16 (a token management list) authorized to access the corresponding user credential 23 from the token DB 170 to transmit a user credential change notification to the corresponding service provider server 16.

The user control unit 150 displays a distribution destination of the user credential 23 to the user terminal 11 in response to the request from the user terminal 11, forcedly invalidates the token, and updates the token management list (a list of corresponding users in the token DB 170).

The user control unit 150 performs control such that the user terminal 11 identified by the user identifier can refer to the content of its token (the service provider server 16 to which the token is sent, the user credential 23 that can be acquired, and the validity period of the token) from a remote location. The user control unit 150 further has a function of causing the user terminal 11 to forcedly invalidate the token and to change the user credential 23 that can be acquired.

The IF unit 160 performs transmission and/or reception of messages to and from the user information issuing organization 15 and the service provider server 16 over the Internet. Specifically, the IF unit 160 transmits a change notification of change to the service provider server 16 and receives a token request from the service provider server 16. In addition, the IF unit 160 accepts a signature notification from the user information issuing organization 15. In addition, the IF unit 160 accepts authorization from the user terminal 11 when the validity period of a token expires.

The token DB 170 stores the identifier described in the DID document 21, the user credential 23 that can be acquired, the service provider server 16 that is a transmission destination of the token, and the list of validity periods of the tokens 24 (token management list). The invalidated token list 171 manages tokens whose validity periods have expired and tokens forcedly invalidated by a user.

The signature list DB 180 stores a list of signed user credentials 23 for each DID document 21.

The policy DB 190 stores a policy of access authorities when the service provider server 16 accesses the service endpoint 14 retaining the user credential 23.

An operation of the user credential control system 1000 configured as described above will be described below.

First, overviews <1> to <3> of functions of the authorization server 100 will be described with reference to FIGS. 1, 3, and 4.

<1>

The user credential control system 1000 introduces the authorization server 100 as one server configuring the service endpoint 14 described in the DID document 21 based on DIDs of the W3C as illustrated in FIG. 1.

When the user information issuing organization 15 signs the DID document 21 or the credential of the user terminal 11, the user information issuing organization 15 notifies the authorization server 100 of the fact that the DID document 21 or the user credential 23 of the user terminal 11 identified by the DID has been signed.

<2>

Figure 3:
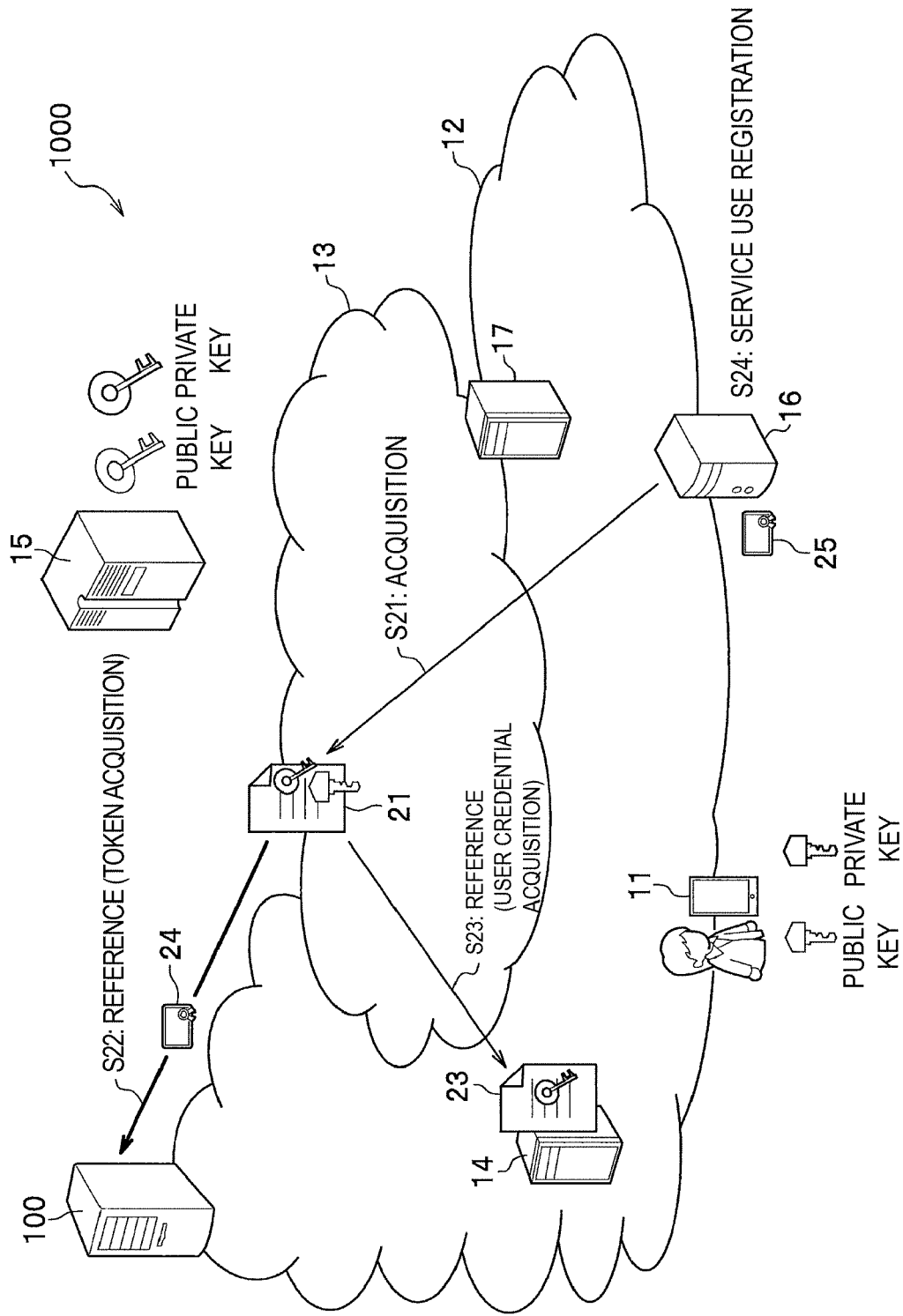
FIG. 3 is a diagram illustrating an overview of a function of the authorization server of the user credential control system according to the embodiment of the present invention.

When the service provider server 16 registers the user terminal 11, the service provider server acquires the DID described in the DID document 21 (see S21) and the token 24 from the authorization server 100 based on the DID (see S22) as illustrated in FIG. 3. At this time, the service provider server 16 presents the authorization server 100 with an electronic certificate 25 certifying its company name and service content (business type).

The authorization server 100 describes, in the token 24, a user credential 23 that can be acquired by the service provider server 16 in accordance with the company name and the type of the service of the service provider server. The token 24 is an acquisition authority on the user credential 23. In this user credential 23, for example, a DID, an access authority to the user credential 23, the service provider server 16 capable of acquiring the token 24, and the validity period of the token 24 are described.

The authorization server 100 registers a policy of the access authority to the user credential 23 in advance (which will be described below).

The authorization server 100 stores the DID, the credential that can be acquired, the service provider server 16 that is a transmission destination of the token, and a list of the validity periods of tokens 24 (which will be described below).

The service provider server 16 accesses the service endpoint 14 (a storage) using the token 24 to acquire the user credential 23 of the user terminal 11 (see S23). The user credential 23 of the user terminal 11 can be acquired again with no need to acquire authorization of the user again within the validity period of the token 24 (see "service use registration" in S24).

<3>

Figure 4:
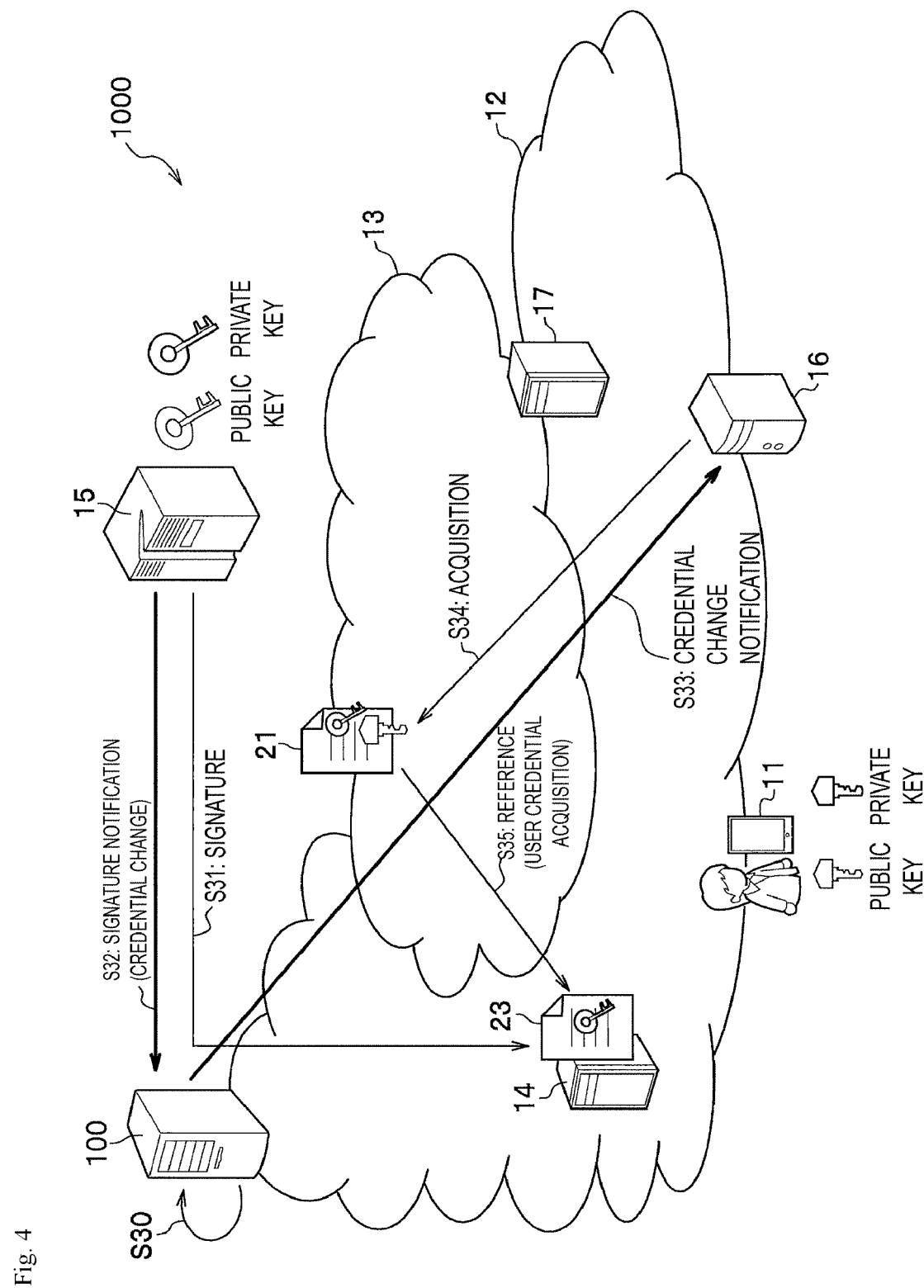
FIG. 4 is a diagram illustrating an overview of a function of the authorization server of the user credential control system according to the embodiment of the present invention.

The authorization server 100 stores the DID, the user credential 23 that can be acquired, the service provider server 16 that is a transmission destination of the token, and a list of the validity periods of tokens 24 as illustrated in FIG. 4 (see S30).

When the user terminal 11 changes the user credential 23 and the user information issuing organization 15 signs the user credential (see S31), the user information issuing organization 15 transmits a signature notification to the authorization server 100 (see S32).

The authorization server 100 notifies the service provider server 16 having the access authority to the user credential 23 that is associated with the notified signature, of the change of the credential (see S33).

The service provider server 16 acquires the DID described in the DID document 21 (see S34) and acquires the user credential 23 of the user terminal 11 from the service endpoint 14 (a storage) based on the DID (see S35).

Next, the operation of the user credential control system 1000 will be described in detail.

Figure 12:
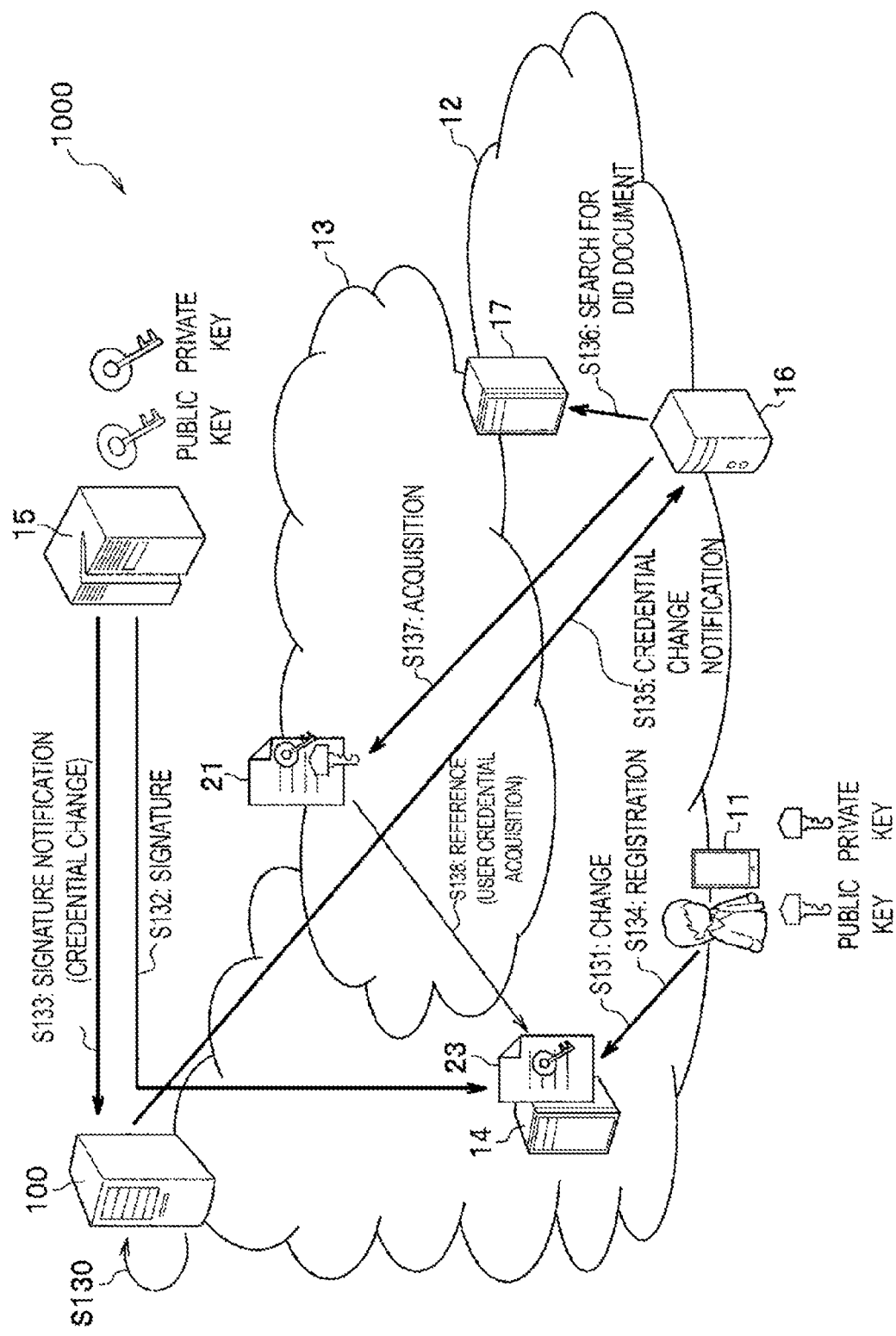
FIG. 12 is a diagram for describing change of a credential in the user credential control system according to the embodiment of the present invention.

The user credential control system 1000 performs [Initial Registration] (FIGS. 5 and 6), [Registration of DID Document 21 and Credential] (FIG. 7), [Registration of User with Service] (FIG. 9), and [Change of Credential] (FIG. 12).

[Initial Registration]

FIGS. 5 and 6 are diagrams for describing [Initial Registration] in the user credential control system 1000.

[Initial Registration 1]

FIG. 5 is a diagram illustrating an example of a case in which an electronic certificate is issued to the service provider server 16.

The service provider server 16 acquires, from the authentication station 20, an electronic certificate 25 certifying the company name and type of the service (such as finance, e-commerce, social network service (SNS), or the like) in advance (see S101) and presents the electronic certificate to the authorization server 100 to acquire a token as illustrated in FIG. 5.

[Initial Registrations 2 and 3]

FIG. 6 is a diagram illustrating a token issuance policy registration of the authorization server. When the electronic certificate 25 is acquired from the service provider server 16 (see S102), the authorization server 100 acquires a certification authority (CA) certificate 26 from the authentication station 20 (see S103) to verify the electronic certificate 25 and check the company name and type of the service of the service provider server 16 as illustrated in FIG. 6.

The policy registration unit 130 (see FIG. 2) of the authorization server 100 registers the policy of access authority to the user credential 23 described in the token 24 based on the service provider server 16 and its service type in advance. Alternatively, the user terminal 11 may register the policy of access authority to its own user credential 23 in advance.

[Registration of DID Document 21 and Credential]

Figure 7:
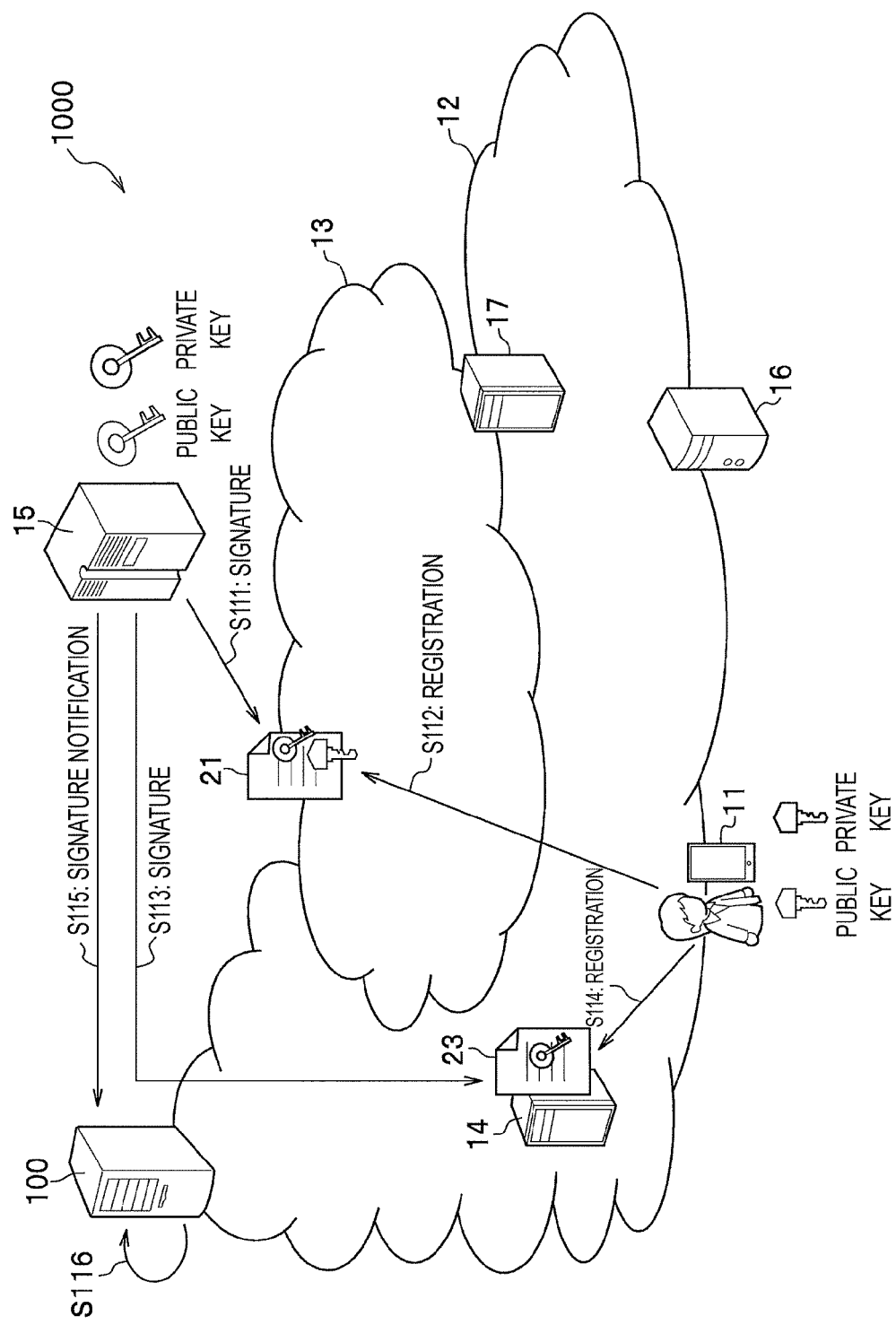
FIG. 7 is a diagram for describing registration of a DID document and a credential in the user credential control system according to the embodiment of the present invention.

FIG. 7 is a diagram for describing [Registration of DID Document 21 and Credential] in the user credential control system 1000.

The user terminal 11 creates a DID document 21 identified with a user ID (Decentralized ID or DID) that it owns and manages and registers the DID document in the shared ledger 13 on the Internet 12. The DID document 21 includes a public key (generated by the user terminal 11) for authenticating a service endpoint 14 (e.g., a storage) in which a user credential 23 (user information such as a name, address, work history, education history, or qualification) 23 is registered and the owner (user) of the DID document 21. This DID document 21 is electronically signed by the user information issuing organization 15 after the authenticity of the user is confirmed, and the user information issuing organization 15 guarantees the authenticity of the DID document 21 (see S111 and S112).

The user terminal 11 registers its user credential 23 in the service endpoint 14 by associating it with its DID (see "registration" in S114). This user credential 23 is electronically signed by the user information issuing organization 15 after the authenticity of the user (Verifiable Credential) is confirmed (see S113), and the user information issuing organization 15 guarantees the authenticity of the user credential 23.

Figure 20:
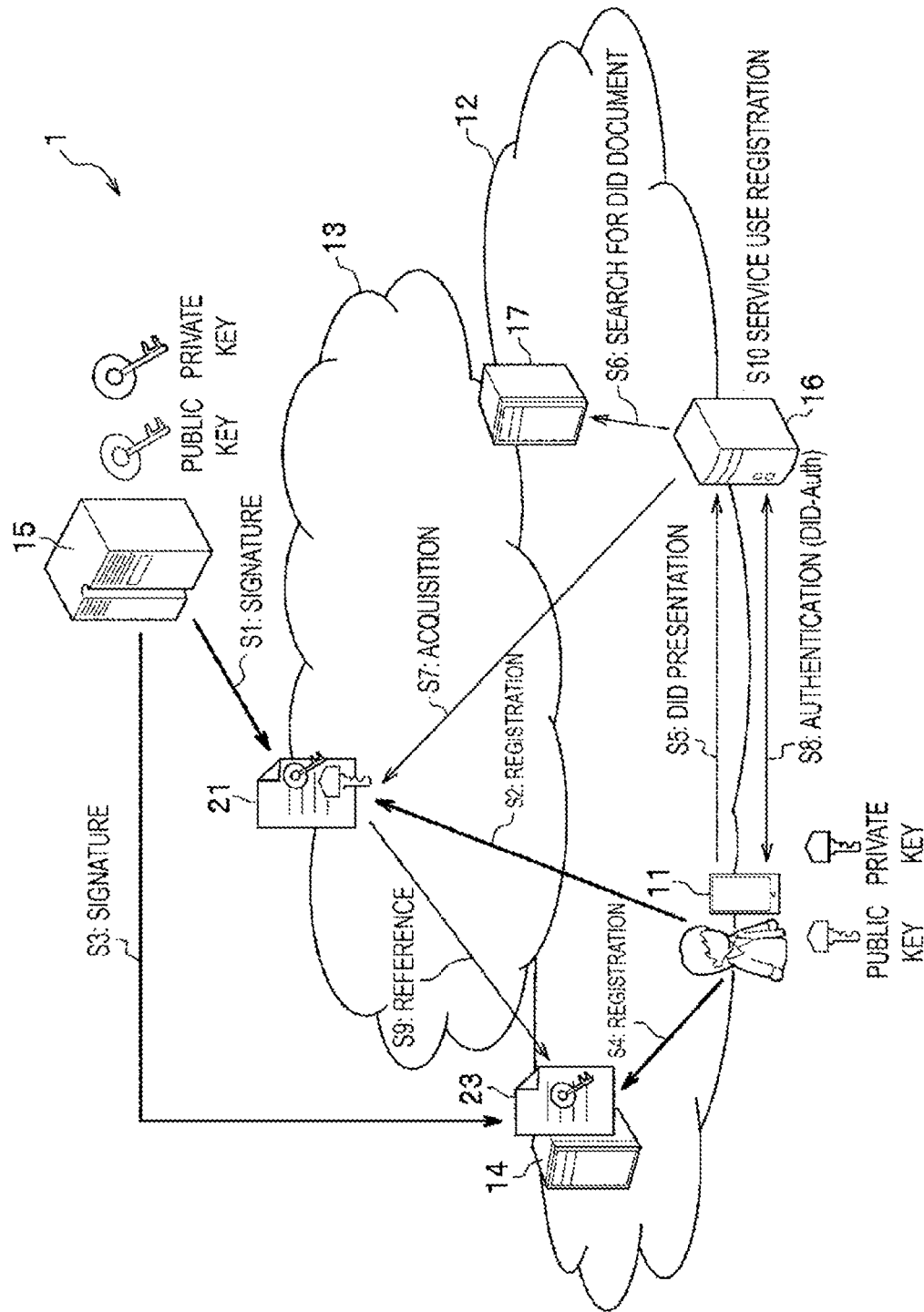
FIG. 20 is a configuration diagram of a system using DIDs of the W3C described in PTL 1.
Figure 21:
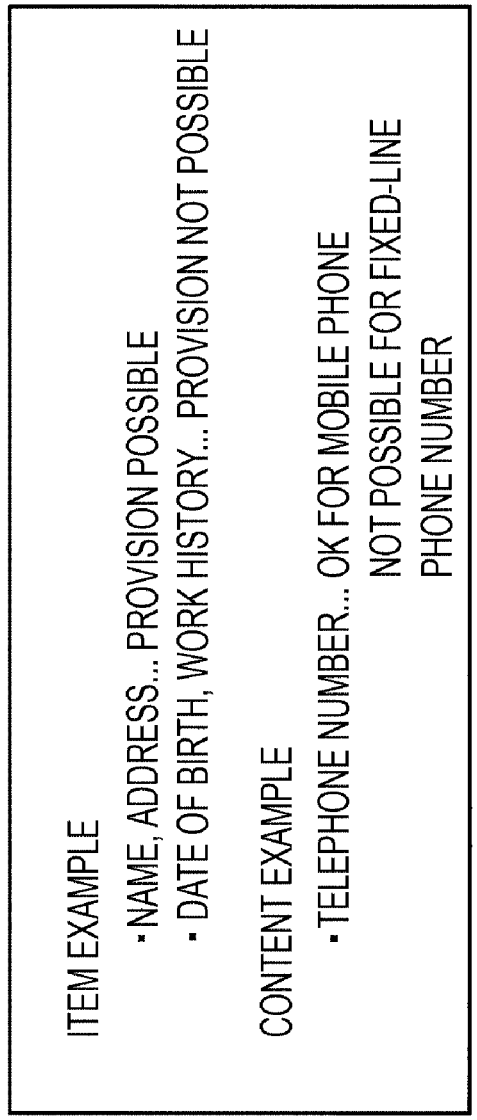
FIG. 21 is a diagram illustrating an item example of the user credential of FIG. 20 and a content example of the user credential.
Figure 22:
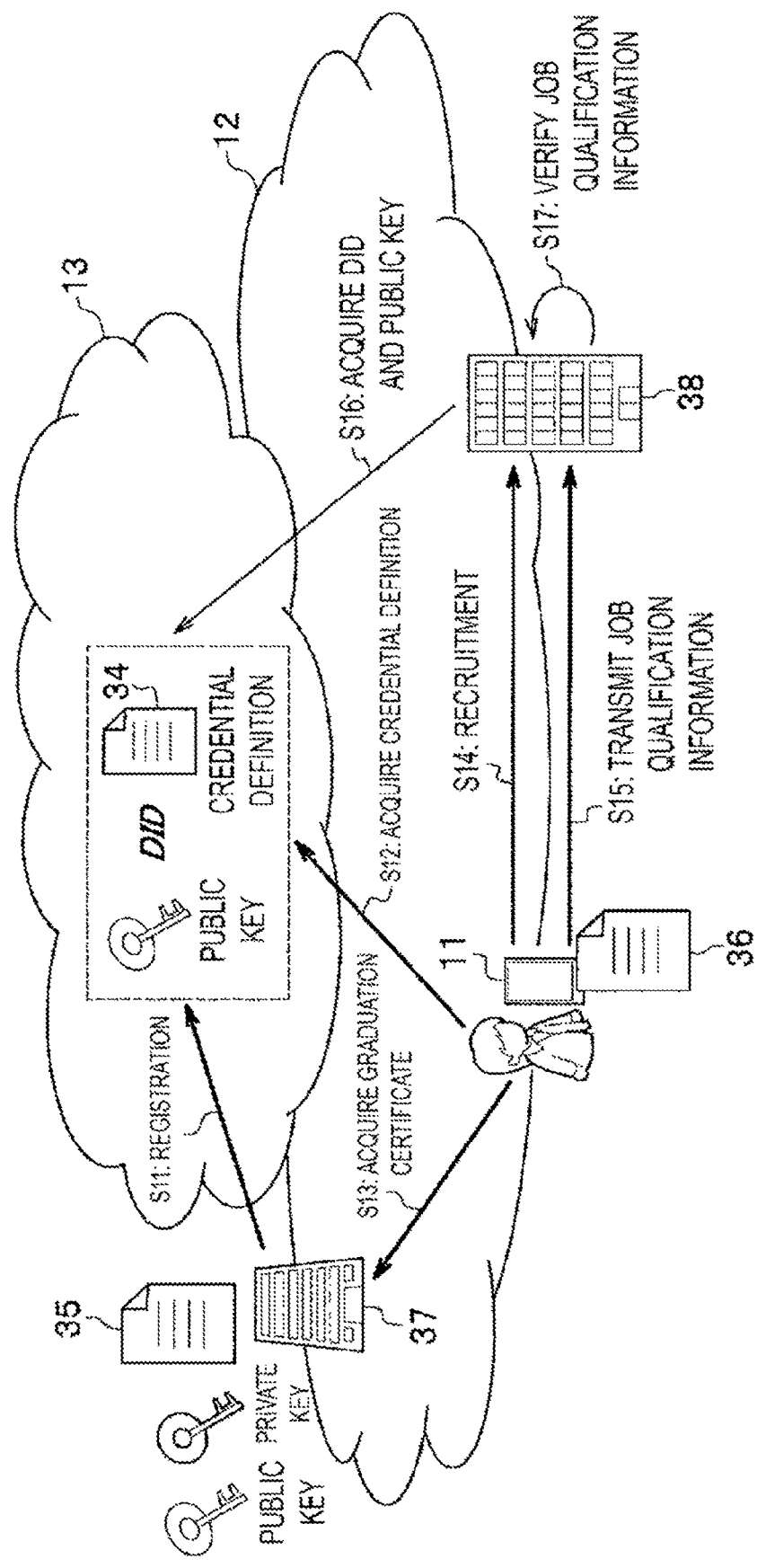
FIG. 22 is a configuration diagram illustrating transmission of a user credential using Hyperledger Indy described in PTL 2 and PTL 3.

The operation up to [Registration of DID Document 21 and Credential] is the same as that in FIG. 20 (the related art).

After the user information issuing organization 15 signs the DID document 21 or the user credential 23 of the user (see "signature" in S111 and "signature" in S113), the user information issuing organization notifies the authorization server 100 of the fact that the DID document 21 or the user credential 23 of the user terminal 11 identified with the DID has been signed (see "signature notification" in S115).

The authorization server 100 stores a list of user credentials 23 that are associated with the same DID for each DID document 21 (see S116). That is, the authorization server 100 stores a list of signed user credentials 23 for each DID document 21.

In this manner, the authorization server 100 stores a list of credentials of the user terminal 11 and enables the user terminal 11 to control a credential to be provided to each service provider based on the company name or service type of the service provider.

The user credential control system 1000 describes the authorization server 100 as a service endpoint 14 in the DID document 21 to enable the service provider server 16 to access the authorization server 100 to check and acquire an access authority to the user credential 23 of the user terminal 11.

Figure 8:
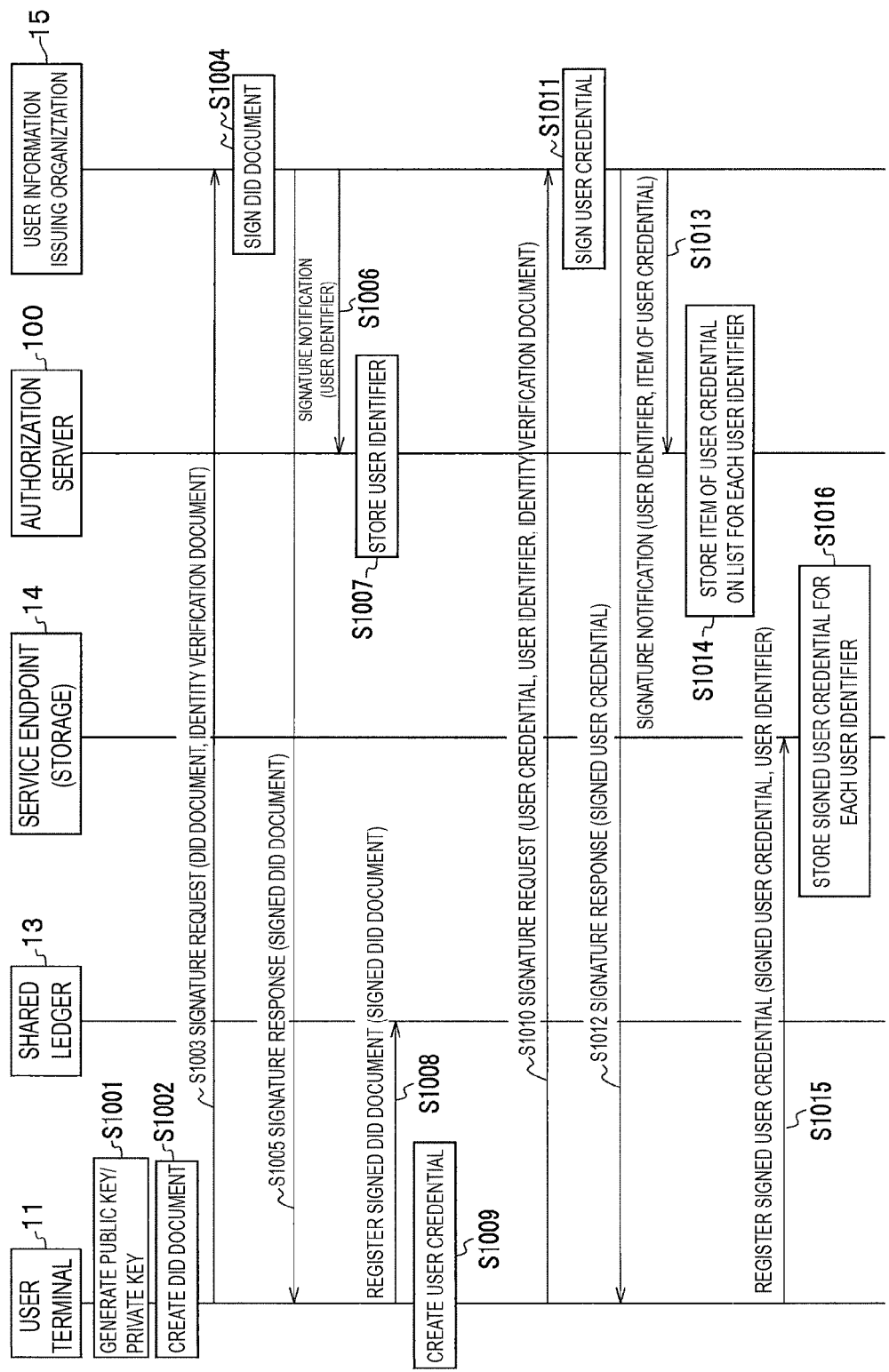
FIG. 8 is a control sequence diagram illustrating details of [Registration of DID Document and Credential] in the user credential control system according to the embodiment of the present invention.

FIG. 8 is a control sequence diagram showing details of [Registration of DID Document 21 and Credential] in the user credential control system 1000.

The user terminal 11 generates a public key/a private key (see S1001).

The user terminal 11 creates a DID document 21 (see S1002). Specifically, in the creation of this DID document 21, the identifier of the user, the service endpoint 14, the public key, and the like are described.

The user terminal 11 transmits a signature request to the user information issuing organization 15 (see "DID document 21 and identity verification document" in S1003).

The user information issuing organization 15 signs the signature request (the DID document 21) transmitted from the user terminal 11 (see S1004). The user information issuing organization 15 signs with a private key of the user information issuing organization 15.

The user information issuing organization 15 responds to the user terminal 11 with a signature ("signed DID document 21" in S1005) and notifies the authorization server 100 of a signature notification (a user identifier) (see S1006).

The authorization server 100 stores the "user identifier" that is notified of with a signature by the user information issuing organization 15 (see S1007).

When the signed response (the signed DID document 21) is received from the user information issuing organization 15, the user terminal 11 registers the signed DID document 21 in the shared ledger 13 (see "signed DID document 21" in S1008).

The user terminal 11 creates a user credential 23 (see S1009). This user credential 23 describes user information such as a name, address, work history, education history, qualification, or the like.

The user terminal 11 transmits a signature request (the user credential 23, the user identifier, and the identity verification document) to the user information issuing organization 15 (see S1010). This signature request is performed online or at a store.

The user information issuing organization 15 signs the signature request (the user credential 23) transmitted from the user terminal 11 (see S1011). The user information issuing organization 15 signs with a private key of the user information issuing organization 15.

The user information issuing organization 15 responds to the user terminal 11 with a signature ("signed user credential 23" in S1012) and notifies the authorization server 100 of a signature notification (with the user identifier and items of the user credential 23) (see S1013). Here, the user identifier is included in the DID document 21 to identify the DID document 21. The user identifier is transmitted from the user information issuing organization 15 as a parameter of the signature notification (in fact, the user identifier is included rather than a DID).

The authorization server 100 stores items of the user credentials 23 in a list for each user identifier signed and notified of by the user information issuing organization 15 (the name of the list is "list of items of user credential 23") (see S1014).

The user terminal 11 registers the signed user credential 23 (the signed user credential 23 and a user identifier) and transmits the user credential to the service endpoint 14 (see S1015). The service endpoint 14 stores the signed user credential 23 for each user identifier (see S1016).

In the manner described above, the control sequence of [Registration of DID Document 21 and Credential] ends.

[Registration of User with Service]

Figure 9:
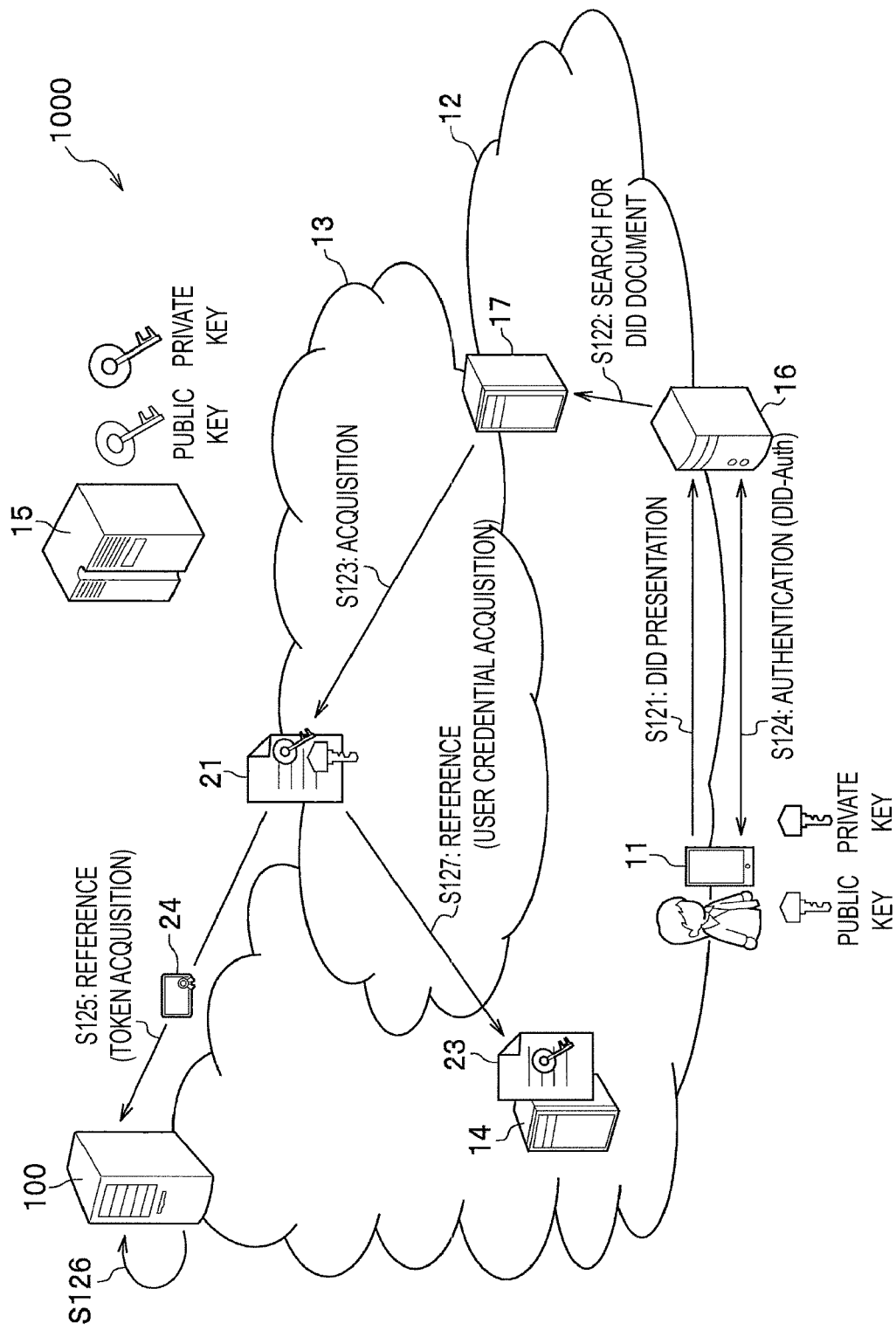
FIG. 9 is a diagram illustrating registration of a user with a service in the user credential control system according to the embodiment of the present invention.

FIG. 9 is a diagram illustrating [Registration of User with Service] in the user credential control system 1000.

The user terminal 11 presents its DID to the service provider server 16 to start user registration (see "presentation of DID" in S121).

The service provider server 16 searches the resolver 17 for the location of the DID document 21 to refer to the DID document 21 of the user terminal 11 present in the shared ledger 13 with the DID (see "search for DID document 21" in S122) and then acquires the DID document 21 (see "acquisition" in S123).

The service provider server 16 extracts the public key of the user terminal 11 from the acquired DID document 21 and verifies that the user terminal 11 authenticated with the DID document 21 has been registered through challenge-response authentication with the user terminal 11 (see "authentication (DID-Auth)" in S124). In addition, the service provider server 16 verifies the signature of the DID document 21 using the pre-acquired public key of the user information issuing organization 15 to verify the authenticity of the DID document 21.

The above operation up to [Registration of User with Service] is the same as the operation of FIG. 20 (related art).

When the authenticity of the owner of the DID document 21 has been confirmed, the service provider server 16 acquires the location of the service endpoint (authorization server 100) from the DID document 21 to access the authorization server 100, and acquires the token 24 (see "reference (token acquisition)" in S125). At this time, the service provider server 16 presents the authorization server 100 with the electronic certificate 25 (see FIG. 3) certifying its company name and type of the service.

The authorization server 100 describes, in the token 24, a user credential 23 that can be acquired by the service provider server 16 in accordance with the company name and the service content of the service provider server 16.

In addition, the authorization server 100 stores the DID, the user credential 23 that can be acquired, the service provider server 16 that is a transmission destination of the token, and a list of the validity periods of the tokens 24 using the DID for identifying the user as a key (see S126).

The service provider server 16 accesses the service endpoint 14 (a storage) using the token 24, and acquires the user credential 23 of the user terminal 11 to register the user terminal 11. The user credential 23 of the user terminal 11 can be acquired again with no need to acquire authorization of the user terminal 11 again within the validity period of the token 24 (see "reference (user credential acquisition)" in S127).

In this manner, the authorization server 100 may issue the token 24 to the service provider server 16 based on the list obtained in S126 above, and can control the user credential 23 that the user terminal 11 provides for each service provider server 16 based on the company name and the type of the service provider server 16.

Figure 10:
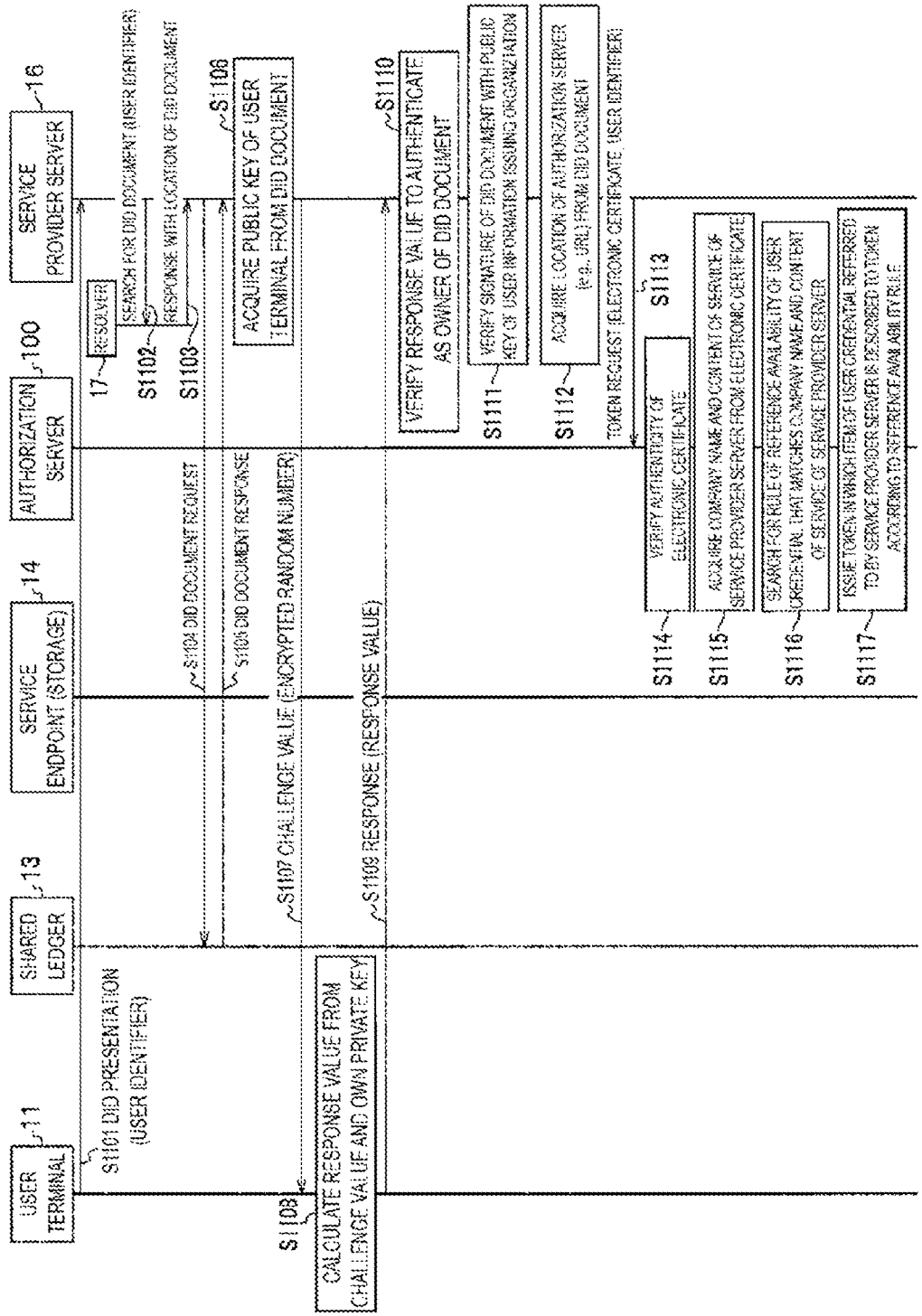
FIG. 10 is a control sequence diagram illustrating details of [Registration of User with Service] in the user credential control system according to the embodiment of the present invention.
Figure 11:
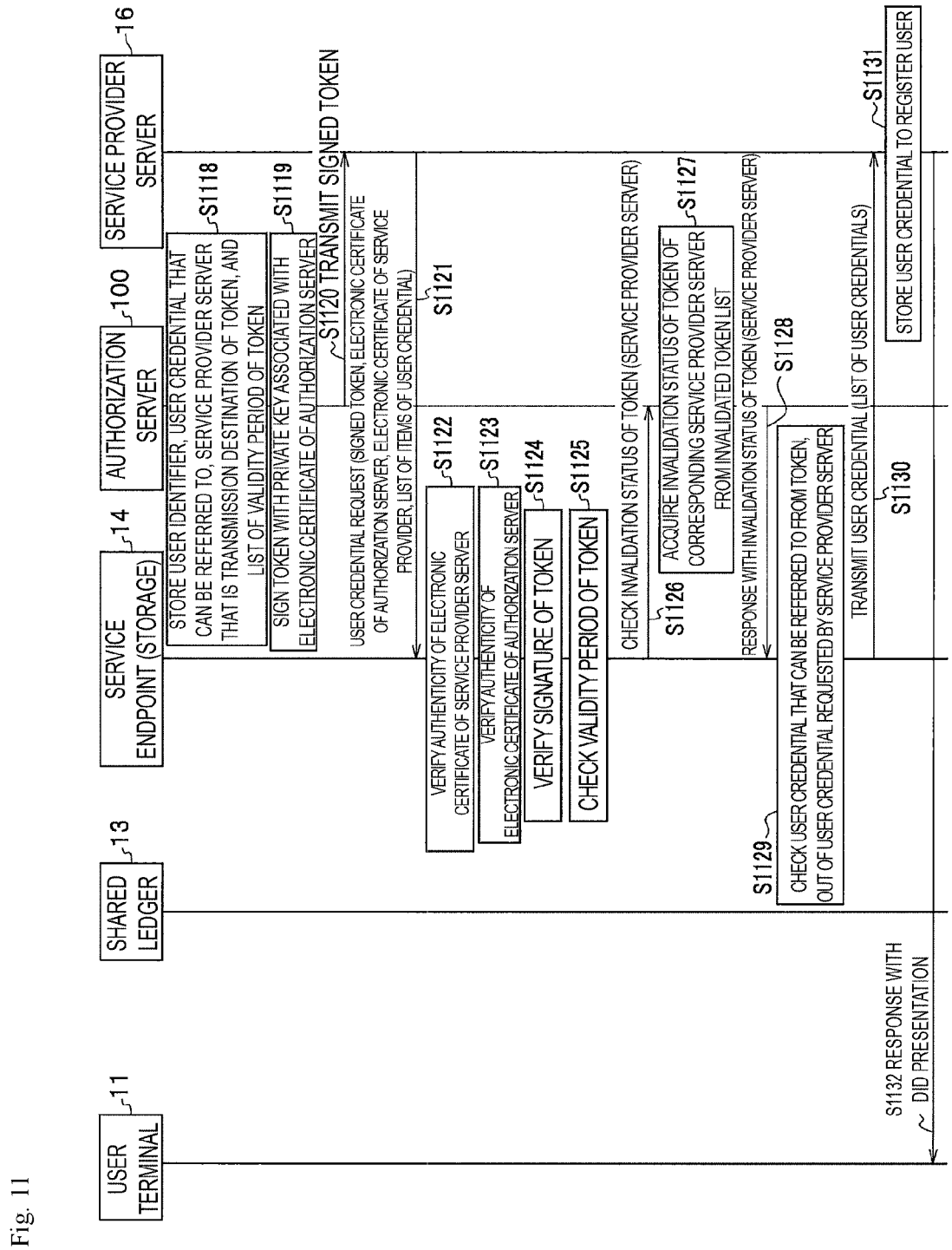
FIG. 11 is a control sequence diagram illustrating details of [Registration of User with Service] in the user credential control system according to the embodiment of the present invention.

FIGS. 10 and 11 are control sequence diagrams illustrating details of [Registration of User with Service] in the user credential control system 1000. Further, FIG. 11 is a control sequence following FIG. 10.

The user terminal 11 presents the service provider server 16 with a DID (a user identifier) as a user registration request (see S1101). Actually, the service provider server 16 is presented with a user identifier for identifying the DID document 21 (described in the DID document 21).

When the DID presentation is received from the user terminal 11, the service provider server 16 searches the resolver 17 for a DID document 21 based on the DID presentation (user identifier) (see S1102), and receives a response with the location of the DID document 21 from the resolver 17 (see S1103). For example, the resolver 17 responds with the Uniform Resource Locator (URL) of the DID document 21 as the location of the DID document 21. The service provider server 16 makes a DID document 21 request to the shared ledger 13 (see S1104), and the shared ledger 13 returns the DID document 21 response to the service provider server 16 (see S1105).

The service provider server 16 acquires the public key of the user terminal 11 from the DID document 21 (see S1106). The service provider server 16 transmits a challenge encrypted with the public key of the user terminal 11 (an (encrypted random number) to the user terminal 11 (see S1107).

The user terminal 11 calculates the value of response using the value of challenge transmitted from the service provider server 16 and its private key (see S1108) and transmits a response (the response value) to the service provider server 16 (see S1109).

The service provider server 16 verifies the response value to authenticate being the owner of the DID document 21 (see S1110).

The service provider server 16 verifies the signature of the DID document 21 with the public key of the user information issuing organization 15 (see S1111). For example, the public key of the user information issuing organization 15 is acquired in advance. Alternatively, the public key is included in a parameter of a DID presentation message from the user terminal 11.

The service provider server 16 acquires the location (e.g., URL) of the authorization server 100 from the DID document 21 (see S1112).

The service provider server 16 makes a token request (an electronic certificate and the user identifier) to the authorization server 100 (see S1113). This electronic certificate is acquired from the authentication station 20 (see FIG. 6) in advance.

The authorization server 100 verifies the authenticity of the electronic certificate (see S1114). The authenticity of the electronic certificate can be verified by, for example, acquiring the public key of the authentication station 20 in advance (see FIG. 6). Alternatively, the verification can be obtained by including the public key in the parameter of the token request message from the service provider server 16.

The authorization server 100 acquires the company name and the service content of the service provider server 16 using the electronic certificate whose authenticity has been verified (see S1115).

The authorization server 100 searches a reference availability rule of the user credential 23 that matches the company name and the service content of the service provider server 16 (see S1116). Here, a policy of a reference authority of the user credential 23 based on the company name and the service content of the service provider server 16 is registered in advance.

The authorization server 100 issues a token in which the item of the user credential 23 referred to by the service provider server 16 is described to a token according to the reference availability rule (see S1117).

The authorization server 100 stores the user identifier, the user credential 23 that can be referred to, the service provider server 16 that is a transmission destination of the token, and a list of the validity periods of tokens (the name of the list is a "token management list") (see S1118).

The authorization server 100 signs the token with a private key associated with the electronic certificate of the authorization server 100 (see S1119). This electronic certificate is acquired from the authentication station 20 in advance (see FIGS. 5 and 6).

The authorization server 100 transmits a signed token to the service provider server 16 (see S1120).

The service provider server 16 transmits a user credential request (the signed token, the electronic certificate of the authorization server, the electronic certificate of the service provider server 16, and the list of user credential items) to service endpoint 14 (see S1121).

The service endpoint 14 receives the user credential request from the service provider server 16 to verify the authenticity of the electronic certificate of the service provider server 16 (see S1122). The authenticity of the electronic certificate can be verified by, for example, acquiring the public key of the authentication station 20 in advance (see FIG. 6). Alternatively, the verification can be obtained by including the public key in the parameter of the token request message from the service provider server 16.

The service endpoint 14 verifies the authenticity of the electronic certificate of the authorization server 100 (see S1123).

The service endpoint 14 verifies the signature of the token (see S1124).

The service endpoint 14 checks the validity period of the token (see S1125).

Here, the token is signed by an electronic certificate issued to the authorization server 100 from the authentication station 20 (see FIG. 6) to identify the signature. Then, when the service endpoint 14 storing the user credential 23 acquires the token from the service provider server 16, the authenticity of the token is checked (the signature is verified).

The service endpoint 14 causes the authorization server 100 to check the invalidation status of the token of the service provider server 16 (see S1126).

The authorization server 100 acquires the invalidation status of the token of the corresponding service provider server 16 using the invalidated token list 171 (see FIG. 2) (see S1127). As described above, the authorization server 100 manages tokens of which the validity periods have passed and tokens that are forcedly invalidated by the user terminal 11 in the invalidated token list 171 (see FIG. 2).

The authorization server 100 responds with respect to the invalidation status of the token of the corresponding service provider server 16 (see S1128).

The service endpoint 14 checks the user credentials 23 that can be referred to from the token, out of the user credentials 23 requested by the service provider (see S1129). The service endpoint 14 transmits the user credentials 23 (the list of user credentials 23) to the service provider server 16 (see S1130).

The service provider server 16 stores the list of user credentials 23 to register the user terminal 11 (see S1131).

The service provider server 16 responds to the user terminal 11 by presenting a DID (see S1132) and thereby completes user registration.

The control sequence of [Registration of User with Service] thereby ends.

[Change of Credential]

FIG. 12 is a diagram for describing [Change of Credential] in the user credential control system 1000.

The authorization server 100 stores DIDs, user credentials 23 that can be acquired, service provider servers 16 that are transmission destinations of tokens, and a list of the validity periods of the tokens 24 (see S130).

With respect to [Change of Credential], steps S131 to S134 illustrated in FIG. 12 are the same as [Registration of DID Document 21 and Credential] described above.

In other words, when the user terminal 11 changes the user credential 23 and the user information issuing organization 15 signs it, the user information issuing organization 15 notifies the authorization server 100 of a signature notification with the signed user credential 23 and the DID associated with the user credential 23 (see S131 to S134).

The authorization server 100 notifies the service provider server 16 with an access authority to the user credential 23 associated with the notified signature of change of the credential (see "credential change notification" in S135).

The service provider server 16 searches the resolver 17 for the location of the DID document 21 (see "search for DID document" in S136) to refer to the DID document 21 of the user terminal 11 present in the shared ledger 13 with the DID and then acquires the DID document 21 (see "acquisition" in S137).

The service provider server 16 accesses the service endpoint 14 (a storage) with the acquired token 24, acquires the user credential 23 after the change of the user terminal 11 to store the list, and updates the list of user credentials 23 retained by the service provider server 16 (see "reference (acquisition of user credential 23)" in S138).

When the validity period of the token 24 expires, the user terminal 11 authorizes the authorization server 100 to provide the changed user credential 23 to the service provider server 16. Then, the service provider server 16 acquires a new token 24 from the authorization server 100 to acquire the changed user credential 23 of the user terminal 11 (see [Registration of User with Service] in S126 and S127 in FIG. 9).

As such, the authorization server 100 may notify the service provider server 16 with an access authority to the credential, of the change of the user credential using the list obtained in step S130 described above.

Further, the user terminal 11 does not need a credential transfer in the terminal when the terminal is lost or the model of the terminal is changed. The user terminal 11 does not need a change procedure for each user-registered service provider during change of the credential.

In addition, the service provider server 16 may use an acquired token notified from the authorization server 100 to acquire the changed user credential 23.

Figure 13:
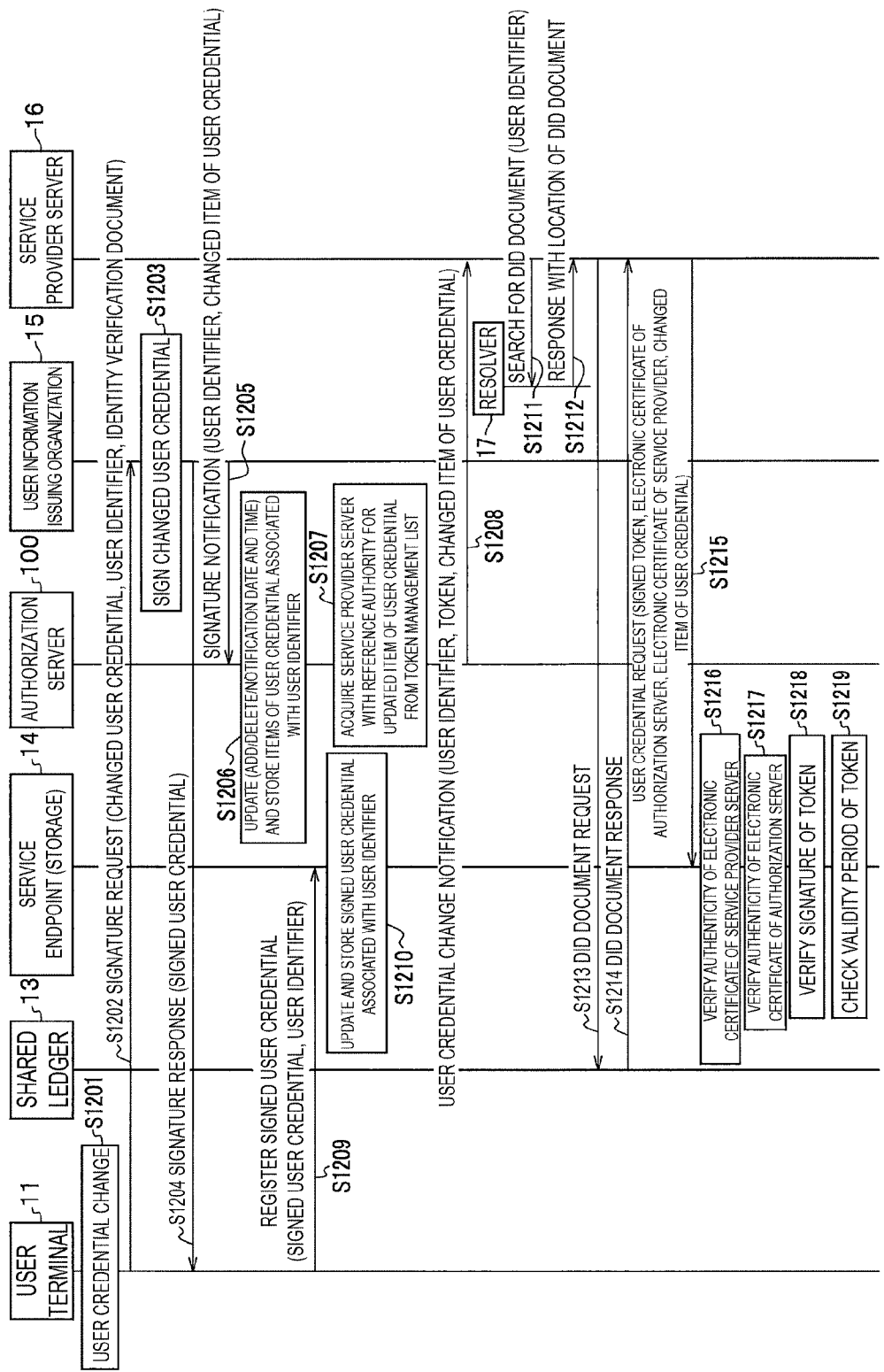
FIG. 13 is a control sequence diagram illustrating details of [Change of Credential] in the user credential control system according to the embodiment of the present invention.
Figure 14:
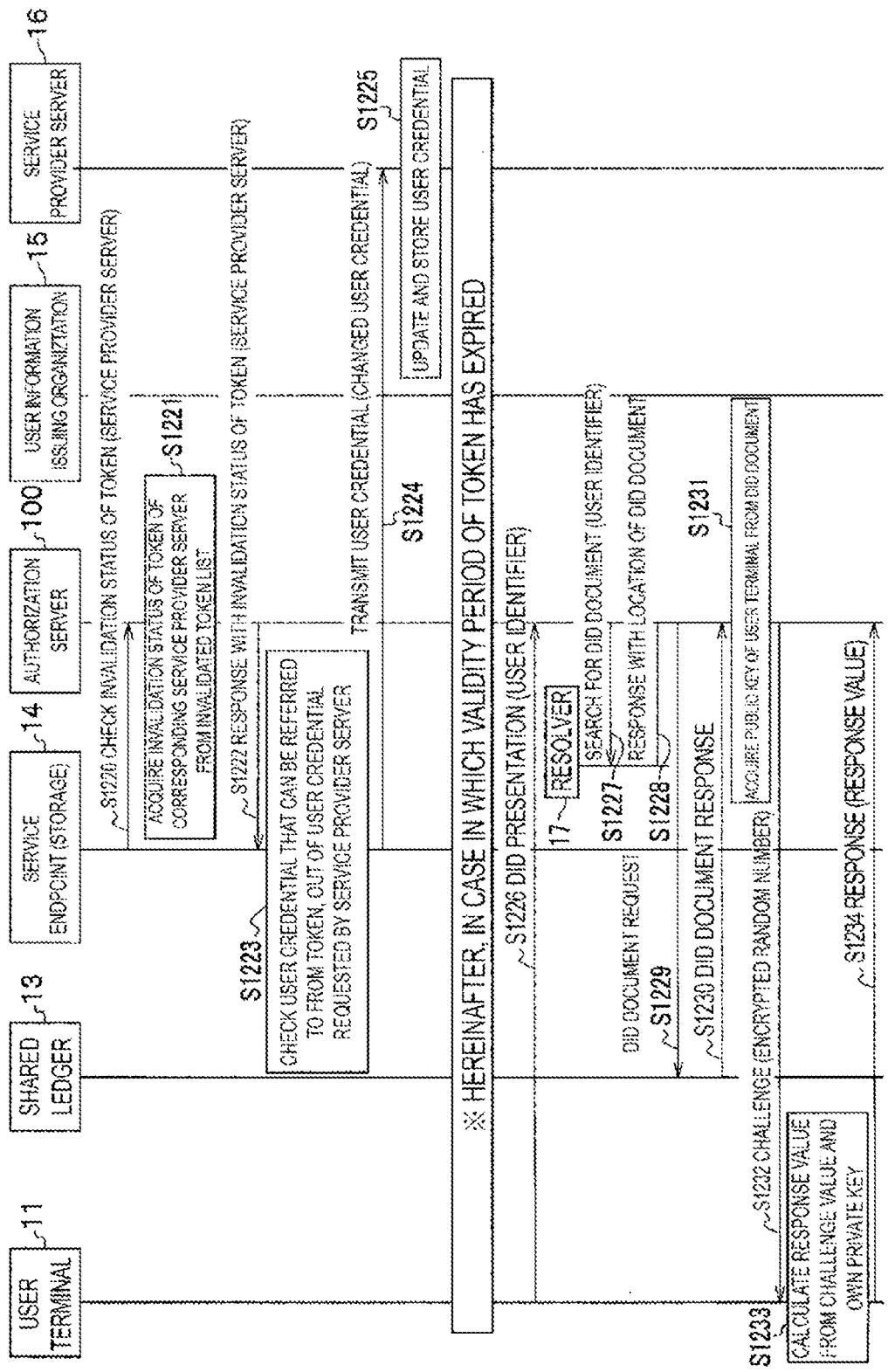
FIG. 14 is a control sequence diagram illustrating details of [Change of Credential] in the user credential control system according to the embodiment of the present invention.
Figure 15:
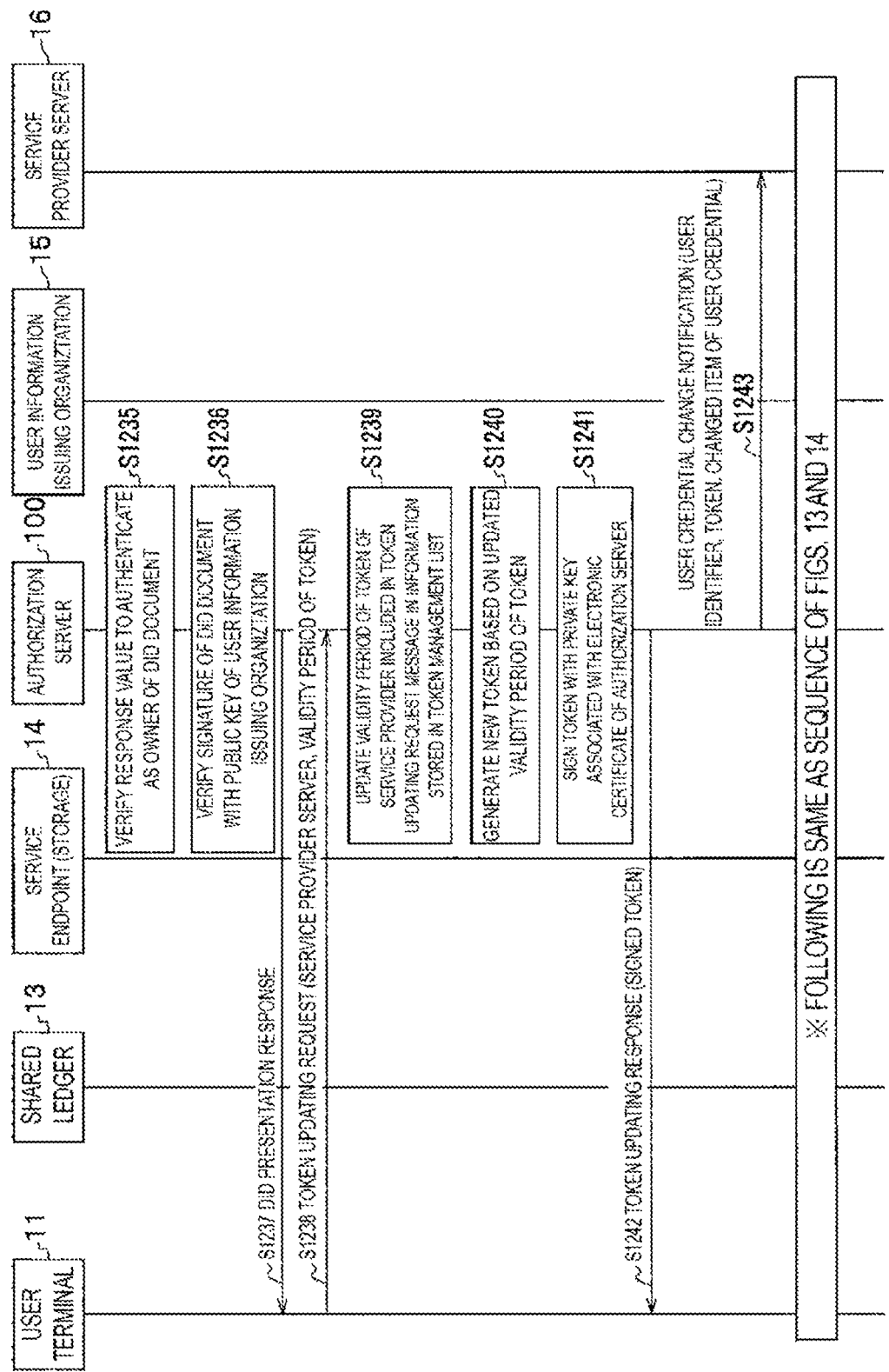
FIG. 15 is a control sequence diagram illustrating details of [Change of Credential] in the user credential control system according to the embodiment of the present invention.

FIGS. 13 to 15 are control sequence diagrams illustrating details of [change of credential] in the user credential control system 1000. Further, FIG. 14 is a control sequence following FIG. 13 and FIG. 15 is a control sequence following FIG. 14.

The user terminal 11 changes the user credential 23 (see S1201).

The user terminal 11 requests a signature from the user information issuing organization 15 (see S1202). This signature request is made online or at a store.

The user information issuing organization 15 signs the signature request changed by the user terminal 11 (the changed user credential 23, an user identifier, and an identity verification document) (see S1203). The user information issuing organization 15 signs with a private key of the user information issuing organization 15.

The user information issuing organization 15 responds to the user terminal 11 with a signature (see "signed user credential" in S1204) and notifies the authorization server 100 of a signature notification (the user identifier and items of the changed user credential 23) (see S1205).

Here, the user identifier is included in the DID document 21 to identify the DID document 21. The user identifier is transmitted from the user information issuing organization 15 as a parameter of a signature notification (in fact, the user identifier is included rather than a DID).

The authorization server 100 updates (adds/deletes/notification date and time) and stores items of the user credential 23 associated with a user identifier (see S1206). Here, when the content of the item of the user credential 23 is changed (no addition/deletion), the content is updated with the latest notification date and time.

The authorization server 100 acquires the service provider server 16 with a reference authority for the updated item of the user credential 23 from the token management list of the token DB 170 (see FIG. 2) (see S1207).

The authorization server 100 transmits a user credential change notification (the user identifier, a token, and the changed item of the user credential 23) to the service provider server 16 (see S1208).

On the other hand, when the signature response is received from the user information issuing organization 15 (see S1204), the user terminal 11 registers the signed user credential 23 in the service endpoint 14 (see "signed user credential and user identifier" in S1209). The service endpoint 14 updates and stores the signed user credential 23 to be associated with the user identifier (see S1210).

When the user credential change notification (the user identifier, the token, and changed item of the user credential 23) is received from the authorization server 100 (see S1208), the service provider server 16 issues a DID document 21 search (a user identifier) to the resolver 17 (see FIG. 12) (see S1211) and receives a response with the location of the DID document 21 (e.g., a response with the URL of the storage) from the resolver 17 (see S1212).

The service provider server 16 requests the DID document 21 from the shared ledger 13 based on the response with the location (see S1213).

The shared ledger 13 responds with the DID document 21 requested by the service provider server 16 (see S1214).

The service provider server 16 gives a user credential request (the signed token, the electronic certificate of the authorization server, the electronic certificate of the service provider server, and the changed item of the user credential) to service endpoint 14 (see S1215).

The service endpoint 14 verifies the authenticity of the electronic certificate of the service provider server 16 (see S1216).

The service endpoint 14 verifies the authenticity of the electronic certificate of the authorization server (see S1217).

The service endpoint 14 verifies the signature of the token (see S1218).

The service endpoint 14 checks the validity period of the token (see S1219).

The service endpoint 14 causes the authorization server 100 to check the invalidation status of the token (see "service provider server" in S1220).

The authorization server 100 acquires the invalidation status of the token of the corresponding service provider server 16 using the invalidated token list 171 (see FIG. 2) (see S1221). As described above, the authorization server 100 manages a token of which the validity period has passed and a token that is forcedly invalidated by the user terminal 11 in the invalidated token list 161 (see FIG. 2).

The authorization server 100 responds to the service endpoint 14 with the invalidation status of the token (see "service provider server" in S1222).

The service endpoint 14 checks the user credential 23 that can be referred to from the token, out of the user credential 23 requested by the service provider server 16 (see S1223).

The service endpoint 14 transmits the changed user credential 23 to the service provider server 16 (see S1224).

The service provider server 16 updates and stores the user credential 23 (see S1225).

Hereinafter, a case in which the validity period of the token has expired will be described.

The user terminal 11 gives a DID presentation (a user identifier) to the authorization server 100. Actually, the user terminal 11 presents a user identifier for identifying the DID document 21 (described in the DID document 21) (see S1226).

When the DID presentation (user identifier) is received from the user terminal 11, the authorization server 100 issues a DID document 21 search (user identifier) to the resolver 17 (see FIG. 12) (see S1227) and receives a response with the location of the DID document 21 (e.g., a response with the URL of the storage) from the resolver 17 (see S1228).

The authorization server 100 requests the DID document 21 from the shared ledger 13 based on the response with the location (see S1229).

The shared ledger 13 responds with the DID document 21 requested by the authorization server 100 (see S1230).

The authorization server 100 acquires a public key of the user terminal 11 from the DID document 21 (see S1231).

The authorization server 100 transmits a challenge encrypted with the public key of the user terminal 11 (encrypted random number) to the user terminal 11 (see S1232).

The user terminal 11 calculates a response value from the value of the challenge and its private key (see S1233).

The user terminal 11 transmits the calculated response (response value) to the authorization server 100 (see S1234).

The authorization server 100 verifies the response value to authenticate that the user terminal is the owner of the DID document 21 (see S1235).

The authorization server 100 verifies the signature of the DID document 21 with the public key of the user information issuing organization 15 (see S1236). Specifically, the authorization server 100 acquires the public key of the user information issuing organization 15 in advance.

Alternatively, the public key is included in parameters of a token update request message from the user terminal.

The authorization server 100 makes a DID presentation response to the user terminal 11 (see S1237).

The user terminal 11 receives the DID presentation response to request update of the token from the authorization server 100 (the service provider server 16, the validity period of the token) (see S1238).

The authorization server 100 updates the validity period of the token of the service provider server 16 included in the token update request message in the information stored in the token management list (see S1239).

The authorization server 100 generates a new token based on the updated validity period of the token (see S1240).

The authorization server 100 signs the token with a private key associated with the electronic certificate of the authorization server 100 (see S1241).

The authorization server 100 gives a token update response (a signed token) (see S1242).

The authorization server 100 transmits a user credential change notification (the user identifier, the token, and the changed item of the user credential 23) (see S1243).

The following processing is the same as the control sequence of FIGS. 13 and 14.

With the processing, the sequence of [change of credential] ends.

[Management of User Credential 23 by User]

Next, management of the user credential 23 by the user will be described.

Management of the user credential 23 by the user includes (1) checking of a distribution destination of the user credential 23 (a service provider server), (2) forced invalidation of a token, and (3) update of the token management list.

Figure 16:
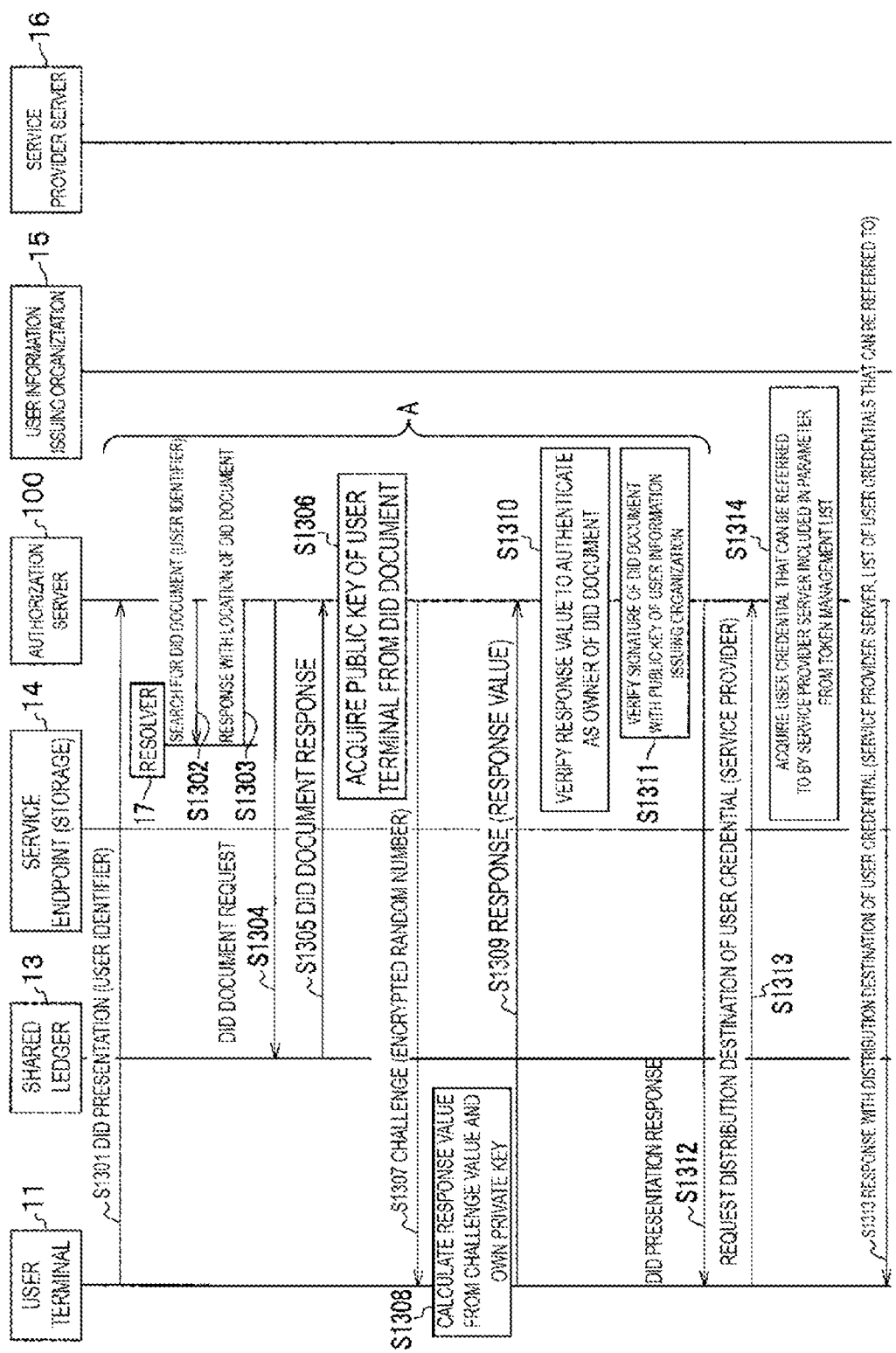
FIG. 16 is a control sequence diagram illustrating details of [Verification of Distribution Destination (service provider server) of User Credential] of [Management of User Credential by User] in the user credential control system according to an embodiment of the present invention.

FIG. 16 is a control sequence diagram illustrating details of [Checking of Distribution Destination (a service provider server) of User Credential 23] of [Management of User Credential 23 by User] in the user credential control system 1000.

The user terminal 11 gives a DID presentation (a user identifier) to the authorization server 100. Actually, the user terminal 11 presents a user identifier for identifying the DID document 21 (described in the DID document 21) (see S1301).

When the DID presentation (user identifier) is received from the user terminal 11 (see S1301), the authorization server 100 issues a DID document 21 search (user identifier) to the resolver 17 (see FIG. 12) (see S1302) and receives a response with the location of the DID document 21 (e.g., a response with the URL of the storage) from the resolver 17 (see S1303).

The authorization server 100 requests the DID document 21 from the shared ledger 13 based on the response with the location (see S1304).

The shared ledger 13 responds with the DID document 21 requested by the authorization server 100 (see S1305).

The authorization server 100 acquires a public key of the user terminal 11 from the DID document 21 (see S1306).

The authorization server 100 transmits a challenge encrypted with the public key of the user terminal 11 (an encrypted random number) to the user terminal 11 (see S1307).

The user terminal 11 calculates a response value from the value of the challenge and its private key (see S1308).

The user terminal 11 transmits the calculated response (response value) to the authorization server 100 (see S1309).

The authorization server 100 verifies the response value to authenticate that the user terminal is the owner of the DID document 21 (see S1310).

The authorization server 100 verifies the signature of the DID document 21 with the public key of the user information issuing organization 15 (see S1311). Specifically, the authorization server 100 acquires the public key of the user information issuing organization 15 in advance.

Alternatively, the public key is included in parameters of a token update request message from the user terminal.

The authorization server 100 gives a DID presentation response to the shared ledger 13 (see S1312).

The shared ledger 13 receives the DID presentation response and requests a distribution destination of the user credential 23 from the authorization server 100 (see "service provider server" in S1313).

The authorization server 100 acquires, from the token management list, a user credential 23 that is referred to by the service provider included in the parameter (see S1314).

The authorization server 100 responds to the user terminal 11 with a distribution destination of the user credential 23 (a list of user credentials 23 that can be referred to by the service provider server 16) (see S1315).

With this process, the sequence of "checking of distribution destination of user credential 23" of [management of user credential 23 by user] ends.

Figure 17:
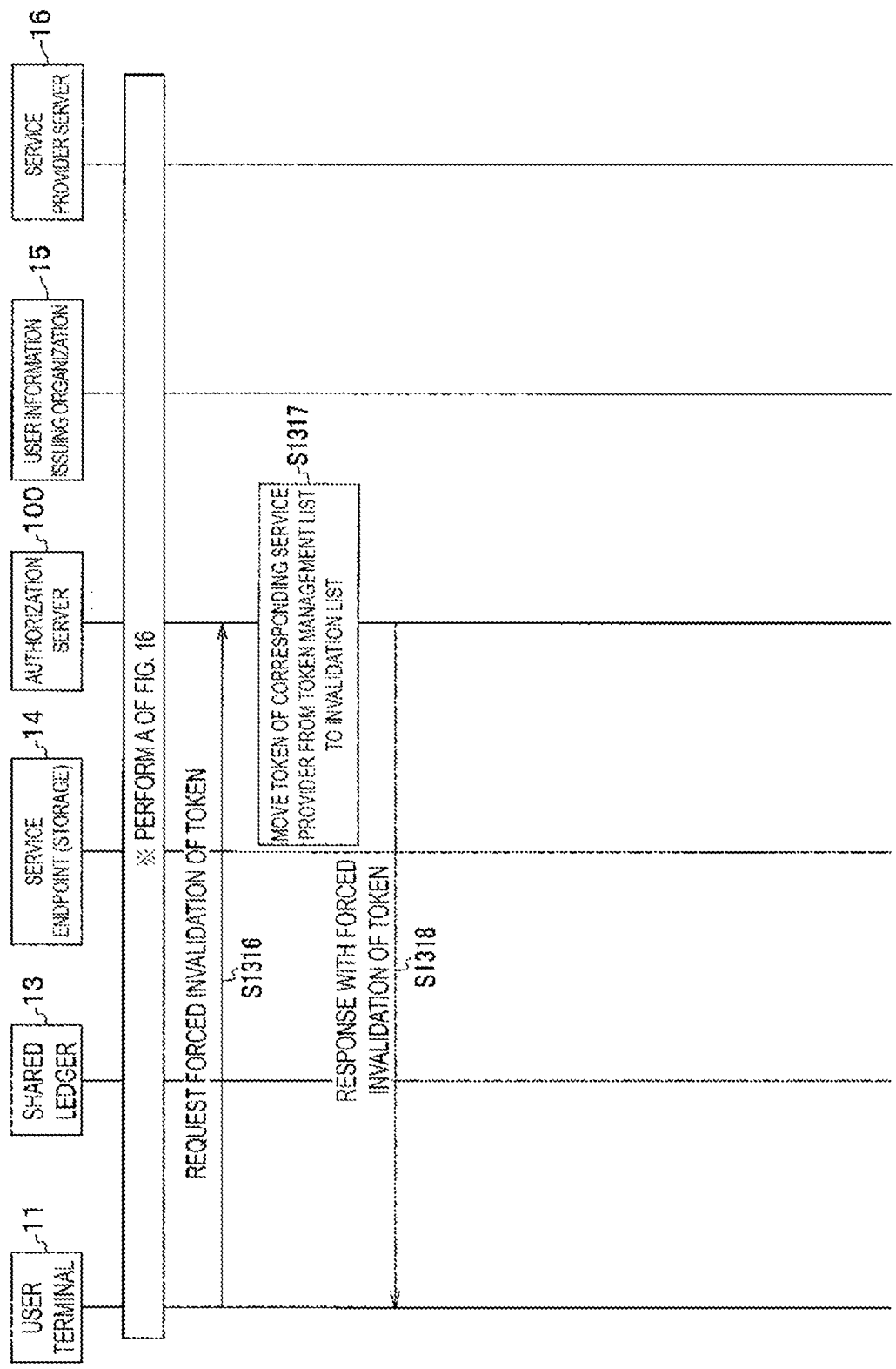
FIG. 17 is a control sequence diagram illustrating details of [Forced Invalidation of Token] of [Management of User Credential by User] in the user credential control system according to the embodiment of the present invention.

FIG. 17 is a control sequence diagram illustrating details of [Forced Invalidation of Token] of [Management of User Credential by User] in the user credential control system 1000. The control sequence indicated by reference sign A in FIG. 16 is performed.

The user terminal 11 requests forced invalidation of the token from the authorization server 100 (see S1316).

The authorization server 100 moves the token of the corresponding service provider from the token management list of the token DB 170 (see FIG. 2) to an invalidation list (see "service provider server" in S1317).

The authorization server 100 responds to the user terminal 11 with forced invalidation of the token (see S1318) and finishes the sequence of "forced invalidation of the token".

Figure 18:
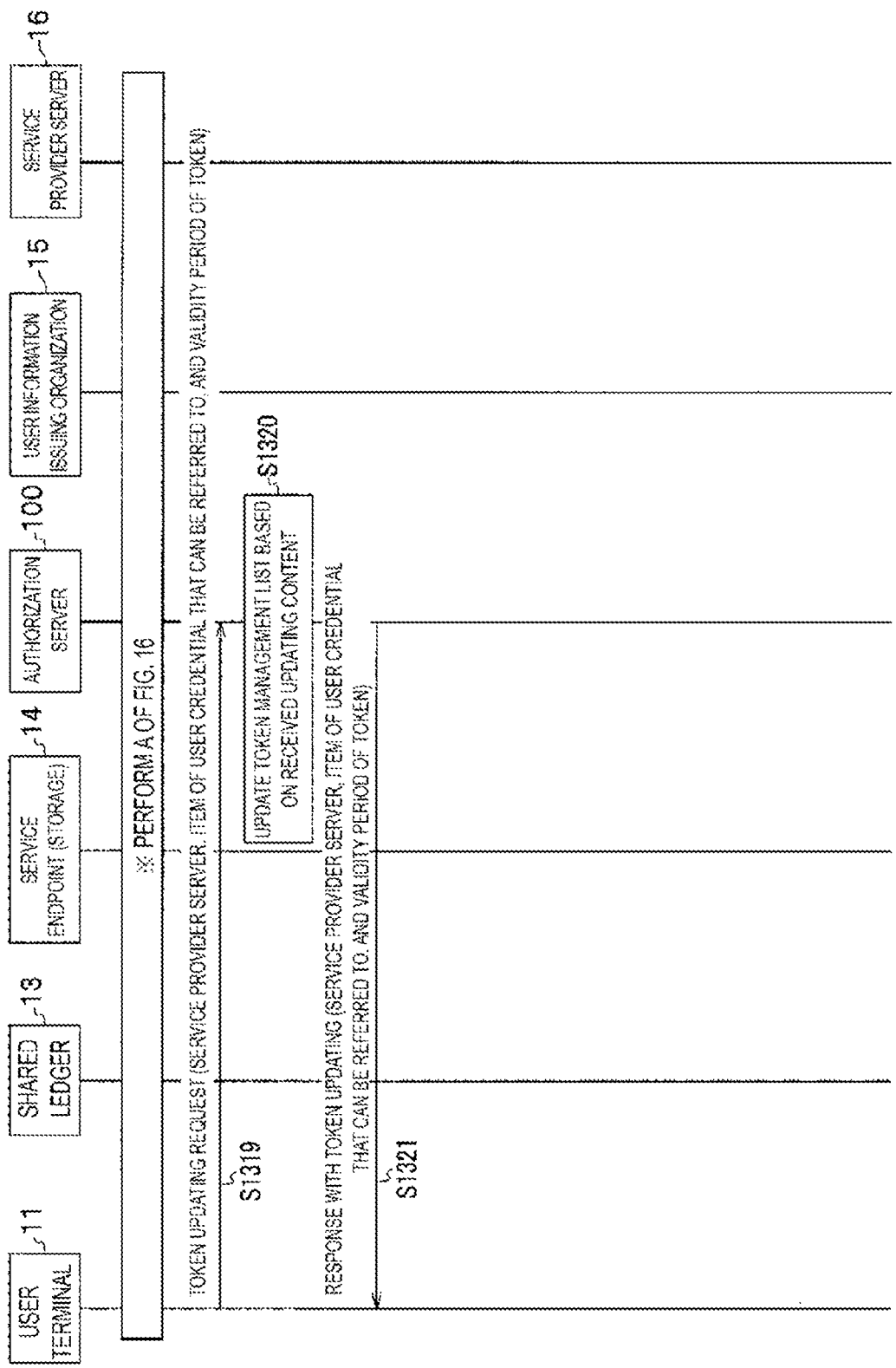
FIG. 18 is a control sequence diagram illustrating details of [Update of Token Management List] of [Management of User Credential by User] in the user credential control system according to the embodiment of the present invention.

FIG. 18 is a control sequence diagram illustrating details of [updating of token management list] of [management of user credential 23 by user] in the user credential control system 1000.

The control sequence indicated by reference sign A in FIG. 16 is performed.

The user terminal 11 requests token update from the authorization server 100 (see "service provider server" in S1319). Specifically, the user terminal 11 transmits, as parameters, data on the service provider that is a transmission destination of the token to be updated, and updating details (selects the item of the user credential 23 that can be referred to, and the validity period of the token as appropriate).

The authorization server 100 updates the token management list based on the received updating details (see S1320).

The authorization server 100 responds to the user terminal 11 with token updating (see S1321) and finishes the sequence of "updating of token management list".

[Hardware Configuration]

Figure 19:
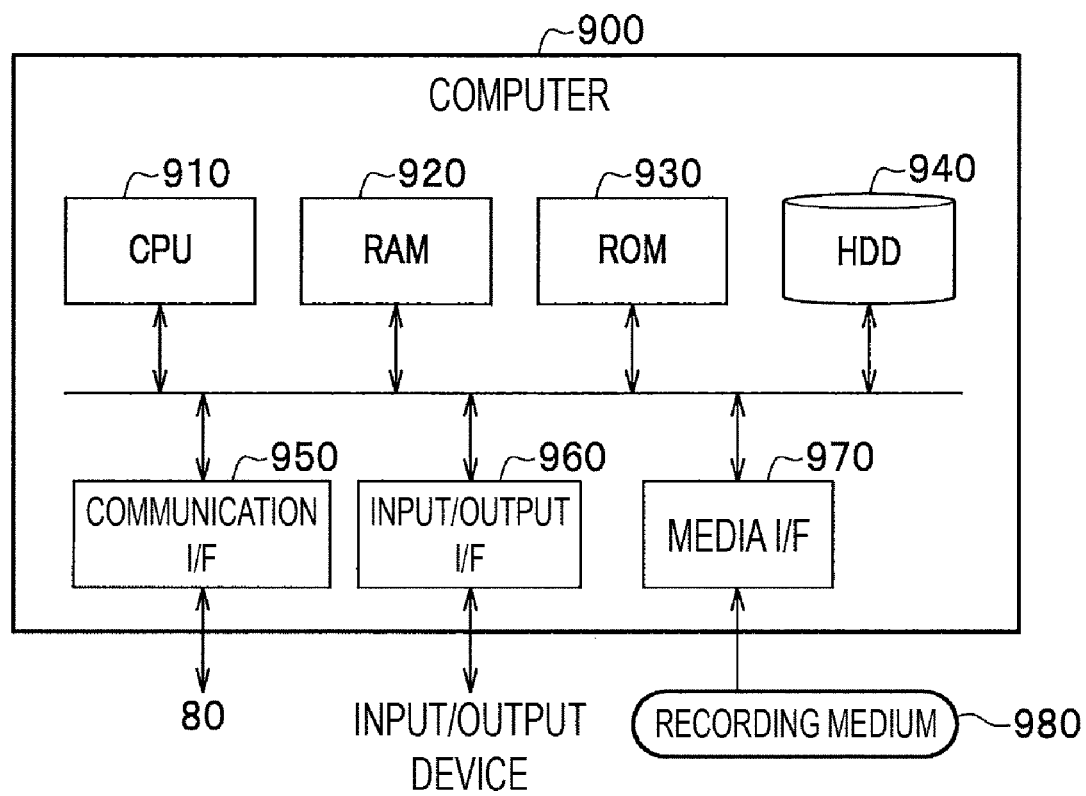
FIG. 19 is a hardware configuration diagram illustrating an example of a computer realizing the function of the authorization server of the user credential control system according to the embodiment of the present invention.

The authorization server 100 according to the present embodiment is realized by a computer 900 configured as illustrated in FIG. 19, for example. Hereinafter, the authorization server 100 will be described as an example. FIG. 19 is a hardware configuration diagram illustrating an example of the computer 900 that realizes functions of the authorization server 100.

The computer 900 includes a CPU 910, a RAM 920, a ROM 930, an HDD 940, a communication interface (I/F) 950, an input/output interface (I/F) 960, and a media interface (I/F) 970.

The CPU 910 operates based on programs stored in the ROM 930 or the HDD 940, and controls each of the units. The ROM 930 stores a boot program executed by the CPU 910 when the computer 900 is activated, a program dependent on the hardware of the computer 900, and the like.

The HDD 940 stores programs executed by the CPU 910, data used by such programs, and the like. The HDD 940 may store, for example, the token DB 170, the signature list DB 180, and the policy DB 190 (see FIG. 2). The communication interface 950 receives data from other devices via a communication network 80, transmits the received data to the CPU 910, and transmits data generated by the CPU 910 to other devices via the communication network 80.

The CPU 910 controls, via the input/output interface 960, an output device such as a display and a printer, and an input device such as a keyboard and a mouse. The CPU 910 acquires data from the input device via the input/output interface 960. The CPU 910 also outputs the generated data to the output device via the input/output interface 960.

The media interface 970 reads a program or data stored in a recording medium 980 and provides the read program or data to the CPU 910 via the RAM 920. The CPU 910 loads the program from the recording medium 980 onto the RAM 920 via the media interface 970 to execute the loaded program. The recording medium 980 is, for example, an optical recording medium such as a digital versatile disc (DVD) and a phase-change rewritable disk (PD), a magneto-optical recording medium such as a magneto optical disk (MO), a tape medium, a magnetic recording medium, a semiconductor memory, or the like.

For example, in a case that the computer 900 functions as the authorization server 100 according to the present embodiment, the CPU 910 of the computer 900 executes the program loaded on the RAM 920 to realize the functions of the units of the authorization server 100. In addition, the HDD 940 stores data of the units of the authorization server 100. Although the CPU 910 of the computer 900 reads these programs from the recording medium 980 and executes the programs, these programs may be acquired from other devices via the communication network 80, as another example.

Advantageous Effects

As described above, the user credential control system 1000 is a user credential control system in which the service provider server 16 and the service endpoint 14 storing the user credential 23 are present on a network (the Internet 12) to which the user terminal 11 is connected, the system including an access control server (the authorization server 100) serving as one service endpoint to control a user ID for identifying the user terminal 11 and the user credential 23 that is user information associated with the user ID in association with each other, wherein the access control server includes the token issuing unit 110 that receives an electronic certificate from the service provider server 16 and issues, to the service provider server 16, a token in which the user credential 23 that can be acquired by the service provider server 16 is described according to the company name and the type of a service of the service provider server 16 described in the electronic certificate, the policy registration unit 130 that registers a policy of an access authority of the service provider server 16 to the user credential 23 based on the company name or the type of the service of the service provider server 16, and a notification unit (the notification reception unit 120) that, when the user credential 23 of the user terminal 11 has been changed, acquires the service provider server 16 with an access authority to the user credential 23 from the token according to the registered policy to notify the service provider server of the change of the user credential 23.

Thus, when the credential of the user terminal 11 has been changed (e.g., when the address has been changed), the service provider server 16 can acquire the changed credential without passing through the user terminal 11. Thus, the user terminal 11 can control credentials to be provided to each service provider server 16. In addition, when a user credential has been changed after registration of a user, the service provider server 16 can update and renew the user information stored in the service provider server 16 and improve the operability of the service. In addition, when the user terminal 11 changes its own credential after registration of a user, the user terminal 11 does not need to perform the procedure to update the credential for each service provider server 16 providing the credential. For this reason, it is possible to improve user convenience.

In the access control server (the authorization server 100) of the user credential control system 1000, the token issuing unit 110 also describes the validity period of the token 24 in the token 24, and if the validity period of the token expires after the token is issued, the token issuing unit issues a new token 24 to the service provider server 16 when the user terminal 11 is authorized to provide the user credential 23 to the service provider server 16.

With this configuration, the token 24 in which the user credential 23 that can be acquired by the service provider server 16 is described can be appropriately issued to the service provider server 16.

With respect to an access control server (the authorization server 100) of the user credential control system 1000, the access control server receives a signature notification from the user information issuing organization and includes a signature list DB 180 that stores a list of signed user credentials 23, among first Decentralized ID (DID) documents 21 identified with the user identifier described in the DID document of the user terminal, for each of the first DID documents, and a notification unit (the notification reception unit 120) performs a change notification of a user credential 23 based on the list of user credentials 23 stored in the signature list DB 180.

In this way, the access control server can check the authenticity of the owner of the DID document 21 and store the list of user credentials 23 for each DID document 21.

In the user credential control system 1000, the access control server includes the user control unit 150 that performs control such that the user terminal 11 identified with the user identifier refers to the content of the token of the user terminal including the service provider server 16 that is a transmission destination of a token, a user credential 23 that can be acquired, and the validity period of the token, and forcibly invalidate the token or change the user credential that can be acquired by the service provider server 16.

In this way, it is possible to display a distribution destination of the user credential 23 on the user terminal 11, and perform forced invalidation of the token 24, and update a token management list (a list of corresponding users stored in the token DB) based on a request from the user terminal 11. In particular, the user terminal 11 identified with the user identifier can refer to the content of its own token 24 from a remote location.

In the user credential control system 1000, the service provider server 16 acquires an electronic certificate that proves its company name and type of service from the authentication station and presents the electronic certificate based on the location of the access control server described in the DID document 21 of the user terminal 11.

In this way, the service provider server 16 can present the electronic certificate that proves its company name and type of service to the access control server as an authentic certificate.

In the user credential control system 1000, the service provider server 16 acquires the location of the access control server from the DID document 21 of the user terminal 11, and accesses the access control server to acquire the token 24.

In this way, the service provider server 16 can execute the sequence for acquiring the token 24 with the access control server after acquiring the location of the access control server.

In the user credential control system 1000, the service provider server 16, along with the token 24, identifies the location of the service endpoint 14 storing the user credential 23 described in the DID document 21 of the user terminal 11 to access the service endpoint 14, the service provider server 16 accesses the service endpoint storing the user credential based on information stored in the token, and the service endpoint identifies the access availability of the service provider server and a user credential that can be acquired by the service provider server based on the information stored in the token.

In this way, the service provider server 16 can access the service endpoint, and the service endpoint can execute a sequence for identifying the user credential 23 that can be acquired by the service provider server 16.

Note that, all or some of the processes described as being performed automatically among the processes described in the present embodiment can be performed manually, or all or some of the processes described as being performed manually can be performed automatically in a known method. In addition, information including the processing procedures, the control procedures, the specific names, and the various types of data and parameters described in the aforementioned document and drawings can be modified as desired unless otherwise specified. In addition, constituent components of the devices illustrated in the drawings are functionally conceptual and are not necessarily physically configured as illustrated in the drawings. That is, the specific modes of dispersion and integration of the devices are not limited to those illustrated and all or some of the devices can be configured such that they are functionally or physically dispersed or integrated in any units according to various loads, use conditions, or the like.

In addition, each of the configurations, functions, processing units, processing means, and the like described above may be partially or entirely realized in hardware, for example, by designing them in an integrated circuit. In addition, each of the configurations, the functions, and the like may be realized in software for a processor to interpret and execute a program that implements the functions. Information such as a program, a table, and a file for realizing each function can be held in a recording device such as a memory, a hard disk, or a solid state drive (SSD) or a recording medium such as an integrated circuit (IC) card, a secure digital (SD) card, or an optical disc.

REFERENCE SIGNS LIST

11 User terminal
12 Internet (network)
13 Shared ledger (blockchain)
14 Service endpoint (storage)
15 User information issuing organization
16 Service provider server
21 DID document
23 User credential
100 Authorization server (access control server)
110 Token issuing unit
120 Notification reception unit (notification unit)
130 Policy registration unit
140 Change notification unit (notification unit)
150 User control unit
160 IF unit
170 Token DB
171 Invalidated token list
180 Signature list DB
190 Policy DB
1000 User credential control system

The invention claimed is:

1. A user credential control system in which a service provider server and a service endpoint storing a user credential are present on a network to which a user terminal is connected, the user credential control system comprising:
an access control server including one or more processors and serving as one service endpoint to control a user ID for identifying the user terminal and a user credential that is user information associated with the user ID in association with each other,
wherein the access control server is configured to:
include a policy data base (DB) in which a reference availability rule is registered, the reference availability rule representing a selected set of credential items selected from items of the user credential for a company name and a service type of the service provider server as user credential items that the service provider server is authorized to acquire,
receive from the service provider server a token request including the user ID and an electronic certificate in which the company name and the service type of the service provider server are described,
search the policy DB for a reference availability rule that matches the company name and the service type described in the electronic certificate,
issue, to the service provider server, a token in which the user ID and the selected set of credential items are described according to the searched reference availability rule,
store, in a token management list, the user ID included in the token request, the selected set of credential items described in the token according to the searched reference availability rule, and information on the service provider server to which the token has been issued, and
when an item of the selected set of credential items of the user credential of the user terminal identified by the user ID is changed,
identify, based on the token management list, the service provider server that is authorized to acquire the changed item, and
notify the identified service provider server of the changed item.

2. The user credential control system according to claim 1, wherein the access control server is further configured to describe a validity period of the token in the token and, when the validity period of the token has expired since the issuance of the token and if the user terminal identified by the user ID authorizes provision of the user credential to the service provider server, issue a new token to the service provider server.

3. The user credential control system according to claim 1,
wherein the access control server is further configured to;
receive a signature notification from a user information issuing organization and
include a signature list Data Base (DB) configured to store a list of signed user credentials, among first Decentralized ID (DID) documents identified with a user identifier described in a DID document of the user terminal, for each of the first DID documents, and
upon reception of the signature notification from a user information issuing organization, perform a change notification of a user credential based on the list of user credentials stored in the signature list DB.

4. The user credential control system according to claim 3,
wherein the access control server is further configured to perform control the user terminal identified with the user identifier to:
refer to a content of the token of the user terminal including the service provider server that is a transmission destination of the token, the selected set of credential items that the service provider is authorized to acquire, and a validity period of the token, and
forcibly invalidate the token or change the selected set of credential items that the service provider is authorized to acquire.

5. The user credential control system according to claim 1,
wherein the service provider server is configured to acquire an electronic certificate that proves the company name and type of the service of the service provider server from an authentication station and present the electronic certificate based on a location of the access control server described in the DID document of the user terminal.

6. The user credential control system according to claim 1,
wherein the service provider server is configured to acquire a location of the access control server from the DID document of the user terminal, and access the access control server to acquire a token.

7. The user credential control system according to claim 1,
wherein the service provider server is configured to identify, along with the token, a location of the service endpoint storing the user credential described in the DID document of the user terminal to access the service endpoint, and
wherein the service endpoint is configured to identify access availability of the service provider server and the selected set of credential items that the service provider server is authorized to acquire, based on information stored in the token.

8. A user credential control method of a user credential control system in which a service provider server and a service endpoint storing a user credential are present on a network to which a user terminal is connected, the user credential control system including an access control server including one or more processors and serving as one service endpoint to control a user ID for identifying the user terminal and a user credential that is user information associated with the user ID in association with each other,
the user credential control method comprising steps of, by the one or more processors of the access control server:
storing, in a policy data base (DB), a reference availability rule representing a selected set of credential items selected from items of the user credential for a company name and a service type of the service provider server as user credential items that the service provider server is authorized to acquire;
receiving from the service provider server a token request including the user ID and an electronic certificate in which the company name and the service type of the service provider server are described,
searching the policy DB for a reference availability rule that matches the company name and the service type described in the electronic certificate,
issuing, to the service provider server, a token in which the user ID and the selected set of credential items are described according to the searched reference availability rule,
storing, in a token management list, the user ID included in the token request, the selected set of credential items described in the token according to the searched reference availability rule, and information on the service provider server to which the token has been issued, and
when an item of the selected set of credential items of the user credential of the user terminal identified by the user ID is changed,
identifying, based on the token management list, the service provider server that is authorized to acquire the changed item, and
notifying the identified service provider server of the changed item.

9. The user credential control method according to claim 8,
wherein a validity period of the token is further described in the token issued in the step of issuing the token, and
wherein the user credential control method further comprises a step of, by the one or more processors of the access control server:
when the validity period of the token has expired since the issuance of the token and if the user terminal authorizes provision of the user credential to the service provider server, issuing a new token to the service provider server.

10. The user credential control method according to claim 8, further comprising steps of, by the one or more processors of the access control server:
receiving a signature notification from a user information issuing organization, and storing, in a signature list Data Base (DB), a list of signed user credentials, among first Decentralized ID (DID) documents identified with a user identifier described in a DID document of the user terminal, for each of the first DID documents, and
upon reception of the signature notification from a user information issuing organization, performing a change notification of a user credential based on the list of user credentials stored in the signature list DB.

11. The user credential control method according to claim 10, further comprising steps of, by the one or more processors of the access control server:
performing control of the user terminal identified with the user identifier to:

refer to a content of the token of the user terminal including the service provider server that is a transmission destination of the token, the selected set of credential items that the service provider is authorized to acquire, and a validity period of the token, and forcibly invalidating the token or change the selected set of credential items that the service provider is authorized to acquire.

12. The user credential control method according to claim 8, further comprising steps of, by the service provider server:

acquiring an electronic certificate that proves the company name and type of the service of the service provider server from an authentication station; and presenting the electronic certificate based on a location of the access control server described in the DID document of the user terminal.

13. The user credential control method according to claim 8, further comprising steps of, by the service provider server:

acquiring a location of the access control server from the DID document of the user terminal, and accessing the access control server to acquire a token.

14. The user credential control method according to claim 8, further comprising:

identifying, by the service provider server, along with the token, a location of the service endpoint storing the user credential described in the DID document of the user terminal to access the service endpoint, and identifying, by the service endpoint, access availability of the service provider server and the selected set of credential items that the service provider server is authorized to acquire.

* * * * *